(12) United States Patent
Tanaka et al.

(10) Patent No.: US 8,179,768 B2
(45) Date of Patent: *May 15, 2012

(54) OPTICAL SYSTEM FOR COMPENSATING FOR SPHERICAL ABERRATION AND/OR COMA ABERRATION IN AN OPTICAL PICKUP DEVICE AND OPTICAL PICKUP DEVICE HAVING THE SAME

(75) Inventors: Yasuhiro Tanaka, Hyogo (JP);
Michihiro Yamagata, Osaka (JP);
Katsuhiko Hayashi, Nara (JP);
Masahiro Birukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/679,041

(22) PCT Filed: Sep. 19, 2008

(86) PCT No.: PCT/JP2008/002590
§ 371 (c)(1),
(2), (4) Date: Mar. 19, 2010

(87) PCT Pub. No.: WO2009/037850
PCT Pub. Date: Mar. 26, 2009

(65) Prior Publication Data
US 2010/0254248 A1 Oct. 7, 2010

(30) Foreign Application Priority Data

Sep. 20, 2007 (JP) ................. 2007-243733
Dec. 19, 2007 (JP) ................. 2007-327549

(51) Int. Cl.
*G11B 7/00* (2006.01)

(52) U.S. Cl. ...................... 369/112.24; 369/94
(58) Field of Classification Search .................. None
See application file for complete search history.

(56) References Cited

U.S. PATENT DOCUMENTS 6,154,326 A * 11/2000 Ueyanagi et al. ............. 359/819
(Continued)

FOREIGN PATENT DOCUMENTS

JP 09-311271 12/1997
(Continued)

OTHER PUBLICATIONS

International Search Report for corresponding Application No. PCT/JP2008/002590 mailed Dec. 22, 2008.
(Continued)

*Primary Examiner* — Paul Huber
(74) *Attorney, Agent, or Firm* — Renner, Otto, Boisselle & Sklar, LLP

(57) ABSTRACT

An optical system for optical pickup, which optical system is used for performing recording, reproducing, and/or erasing of information on an optical recording medium and has a simple configuration, is provided. An optical pickup device 1 includes a collimator lens system 23, a beam expander 33, and an objective lens system 34 that includes an S-SIL element 27b. The beam expander 33 includes three lens elements 33a to 33c. By moving in an optical axis direction, the two lens elements 33a and 33b included in the beam expander 33 adjust a focal point of a spot formed within an optical recording medium 28, and compensate a spherical aberration caused by the difference in depth between recording layers.

60 Claims, 20 Drawing Sheets

U.S. PATENT DOCUMENTS

| | | |
|---|---|---|
| 6,751,175 B1 | 6/2004 | Maeda et al. |
| 6,781,104 B1 * | 8/2004 | Braat .................. 250/201.5 |
| 6,798,493 B2 * | 9/2004 | Imanishi ..................... 355/55 |
| 2002/0136147 A1 | 9/2002 | Matsui |
| 2005/0068860 A1 | 3/2005 | Kanou |
| 2006/0077865 A1 * | 4/2006 | Eytan et al. ................ 369/125 |
| 2006/0140072 A1 * | 6/2006 | Sato et al. ............... 369/44.23 |
| 2006/0164954 A1 | 7/2006 | Hashimura |

FOREIGN PATENT DOCUMENTS

| | | |
|---|---|---|
| JP | 2000-163793 | 6/2000 |
| JP | 2000-182268 | 6/2000 |
| JP | 2001-524246 | 11/2001 |
| JP | 2003-263770 | 9/2003 |
| JP | 2005-108281 | 4/2005 |
| JP | 2006-202416 | 8/2006 |
| JP | 2002-279680 | 9/2009 |
| WO | 98/49675 | 11/1998 |

OTHER PUBLICATIONS

Form PCT/ISA/237.

* cited by examiner (a) DEPTH OF RECORDING LAYER: 4 μm (b) DEPTH OF RECORDING LAYER: 8 μm (c) DEPTH OF RECORDING LAYER: 0 μm

OPTICAL SYSTEM FOR COMPENSATING FOR SPHERICAL ABERRATION AND/OR COMA ABERRATION IN AN OPTICAL PICKUP DEVICE AND OPTICAL PICKUP DEVICE HAVING THE SAME

This application is a 371 of PCT/JP2008/002590, filed Sep. 19, 2008.

TECHNICAL FIELD

The present invention relates to: an optical system for optical pickup, which optical system performs at least one of reading, writing, and erasing of information on an optical recording medium; and an optical pickup device having the optical system.

BACKGROUND ART

Optical recording media typified by CD (compact disc) and DVD (digital versatile disc) have been widely used for recording various types of information such as video and sound. Recently, further increase of capacity of recording media has been desired in accordance with: enhancement of functions of information processing equipment; and increase of resolution of video equipment.

Reading of information from an optical recording medium and recording of information on the optical recording medium are performed by an optical pickup device irradiating a recording layer of the optical recording medium with a laser beam. Thus, increase of the capacity of the optical recording medium can be achieved by increasing the recording density by decreasing the spot diameter of the beam that is emitted from the optical pickup device. The spot diameter changes depending on the wavelength of the used beam and the NA (numerical aperture) of an objective lens. Specifically, by decreasing the wavelength of the used beam, or by increasing the NA of the objective lens, it is possible to decrease the spot diameter.

In recent years, as an optical recording/reproducing method in which the NA of an objective lens is increased, a near-field optical recording/reproducing method using a SIL (solid immersion lens) is known. In this method, use of an objective lens with an NA exceeding 1 is achieved due to use of the SIL. It is noted that, when the NA of the objective lens exceeds 1, a converging light beam is fully reflected by the exit surface of the objective lens, and hence the light beam is emitted as an evanescent wave, not as a normal light beam. Thus, in the near-field optical recording/reproducing method, the air gap between the exit surface of the objective lens and a surface of an optical recording medium needs to be maintained so as to be shorter than the decay distance of the evanescent wave, in order to propagate the evanescent wave.

Conventionally, in the near-field optical recording/reproducing method using the SIL, information is generally recorded only on one recording layer provided near the surface of the optical recording medium, but methods for recording information on multiple layers have been reported in order to achieve further increase of recording capacity. However, in order to achieve multilayer recording in the near-field optical recording/reproducing method, it is important to focus on each of recording layers at different depths and to compensate an aberration generated at each focal point, in addition to maintaining the above air gap so as to be constant (e.g., see Patent Document 1).

[Patent Document 1] Japanese Laid-Open Patent Publication No. 2003-263770

DISCLOSURE OF THE INVENTION

Problems to be Solved by the Invention

In a conventional multilayer optical recording/reproducing method (a method that is not the near-field optical recording/reproducing method), when recording and/or reproducing of information is performed on each recording layer, the focal point can be adjusted by changing the distance between the objective lens and the optical recording medium, namely, the working distance.

On the other hand, in the near-field optical recording/reproducing method, the distance between the objective lens and the optical recording medium, namely, the air gap, needs to be maintained constant. Thus, the focal point cannot be adjusted by changing the working distance, and a focusing mechanism is additionally required. Further, the NA of the objective lens is much greater than a conventional value. Thus, when focusing is performed on each of the recording layers at different depths from the surface of the optical recording medium, a spherical aberration generated at each focal point becomes very great. For that reason, it is also necessary to compensate the aberration at each focal point.

In the above Patent Document 1, multilayer recording performed by the near-field optical recording/reproducing method is achieved by providing: a beam expander for adjusting the focal point; and a liquid crystal element for compensating the spherical aberration, between the light source and the objective lens. However, use of the beam expander and the liquid crystal element causes a problem that an optical system becomes complicated.

The present invention is made in view of the above problem, and its object is to provide: an optical system for optical pickup, which optical system is used for performing recording, reproducing, and/or erasing of information on an optical recording medium and has a simple configuration; and an optical pickup device having the optical system.

Solution to the Problems

An optical system for optical pickup according to the present invention is used in an optical pickup device that performs at least one of reading, writing, and erasing of information on a recording layer within an optical recording medium. The optical system includes: a wavefront conversion optical system that includes at least one lens element and converts a wavefront of a light beam emitted from an external light source; and an objective optical system that converges a light beam emitted from the wavefront conversion optical system and forms a spot on the recording layer. The wavefront conversion optical system adjusts a focal point of the spot on the recording layer and compensates a spherical aberration of the spot in a state where an interval between a surface of the optical recording medium and a lens element of the objective optical system that is nearest to the surface is maintained constant, by changing an interval in an optical axis direction between the light source and the lens element of the wavefront conversion optical system.

An optical system for optical pickup according to the present invention is used in an optical pickup device that performs at least one of reading, writing, and erasing of information on a recording layer within an optical recording medium. The optical system includes: a wavefront conversion optical system that converts a wavefront of a light beam emitted from an external light source; and an objective optical system that forms a spot on the recording layer by converging a light beam emitted from the wavefront conversion optical system and irradiating the recording layer with the converged light beam as evanescent light. The wavefront conversion optical system, in order from the light source side, includes: a collimator lens system that converts diverging light emitted from the light source, into parallel light; and a beam expander that includes three lens elements, is disposed on an optical path of the parallel light emitted from the collimator lens system, and converts a light beam width of the parallel light to emit the parallel light toward the objective optical system. At least one of the three lens elements that constitute the beam expander adjusts a focal point of the spot on the recording layer and compensates a spherical aberration of the spot in a state where an interval between a surface of the optical recording medium and a lens element of the objective optical system that is nearest to the surface is maintained constant, by moving in an optical axis direction.

An optical system for optical pickup according to the present invention is used in an optical pickup device that performs at least one of reading, writing, and erasing of information on a recording layer within an optical recording medium. The optical system includes: a wavefront conversion optical system that converts a wavefront of a light beam emitted from an external light source; and an objective optical system that forms a spot on the recording layer by converging a light beam emitted from the wavefront conversion optical system and irradiating the recording layer with the converged light beam as evanescent light. The wavefront conversion optical system, in order from the light source side, includes: a collimator lens system that converts diverging light emitted from the light source, into parallel light; and a beam expander that includes two lens elements, is disposed on an optical path of the parallel light emitted from the collimator lens system, and converts a light beam width of the parallel light to emit the parallel light toward the objective optical system. At least one of the two lens elements included in the beam expander adjusts a focal point of the spot on the recording layer and compensates a spherical aberration of the spot in a state where an interval between a surface of the optical recording medium and a lens element of the objective optical system that is nearest to the surface is maintained constant, by moving in an optical axis direction.

Further, an optical pickup device according to the present invention performs at least one of reading, writing, and erasing of information on a recording layer within an optical recording medium. The optical pickup device includes: a light source; the above optical system for optical pickup, which optical system includes the above wavefront conversion optical system and the above objective optical system; a separation section that separates light reflected by the optical recording medium, from an optical path extending from the light source to the optical recording medium; and a detection section that detects the light separated by the separation section.

When the optical system for optical pickup and the optical pickup device are formed as described above, the focal point of converging light is adjusted and the spherical aberration of the converging light is compensated at the same time, by controlling the interval between the light source and the lens element included in the wavefront conversion optical system.

It is noted that, in the present specification, the phrase "adjust a focal point and compensate a spherical aberration" means adjusting the focal point and compensating the spherical aberration in an allowable range where the optical pickup device is usable, and does not necessarily mean that both of them come into the optimum condition in terms of optical characteristics.

Effect of the Invention

According to the present invention, it is possible to adjust the focal point and to compensate the spherical aberration, by using only the lens element of the wavefront conversion optical system. Thus, an additional element for compensating spherical aberration is not required, and an optical system for optical pickup having a simple configuration, and an optical pickup device having the optical system, can be realized.

Figure 1:
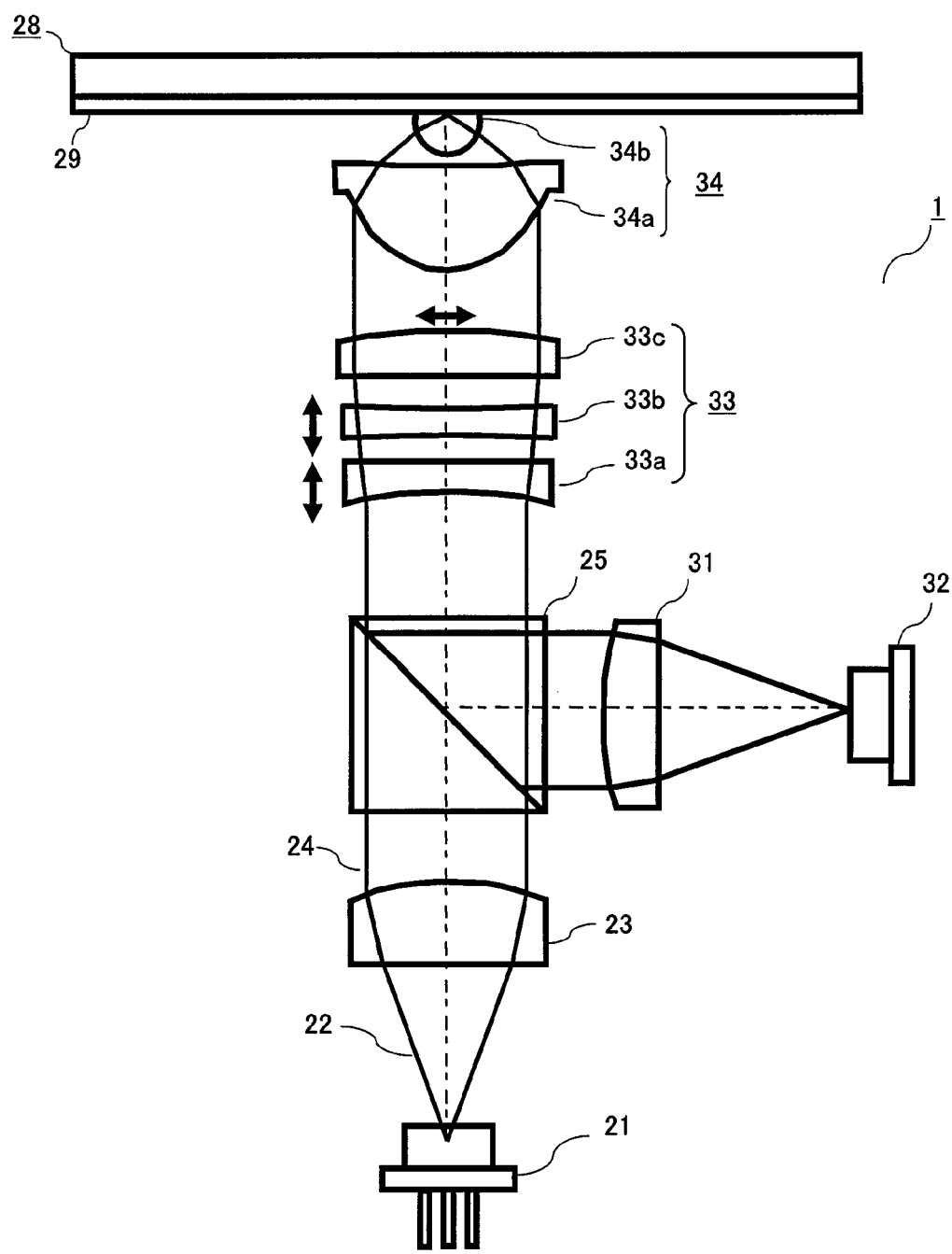
FIG. 1 is a schematic view showing a configuration of an optical pickup device having an optical system for optical pickup according to a first embodiment of the present invention.

DESCRIPTION OF THE REFERENCE CHARACTERS 1, 2 optical pickup device
21 semiconductor laser
23 collimator lens system
25 beam splitter
26 beam expander
26a, 26b lens element
28 optical recording medium
30 recording layer
31 detection lens
32 photo detector
33 beam expander
33a to 33c lens element
34 objective lens system
34a lens element
34b S-SIL (super solid immersion lens) element
35 objective lens system
35a lens element
35b SIL (solid immersion lens) element

BEST MODE FOR CARRYING OUT THE INVENTION

First Embodiment

Figure 2:
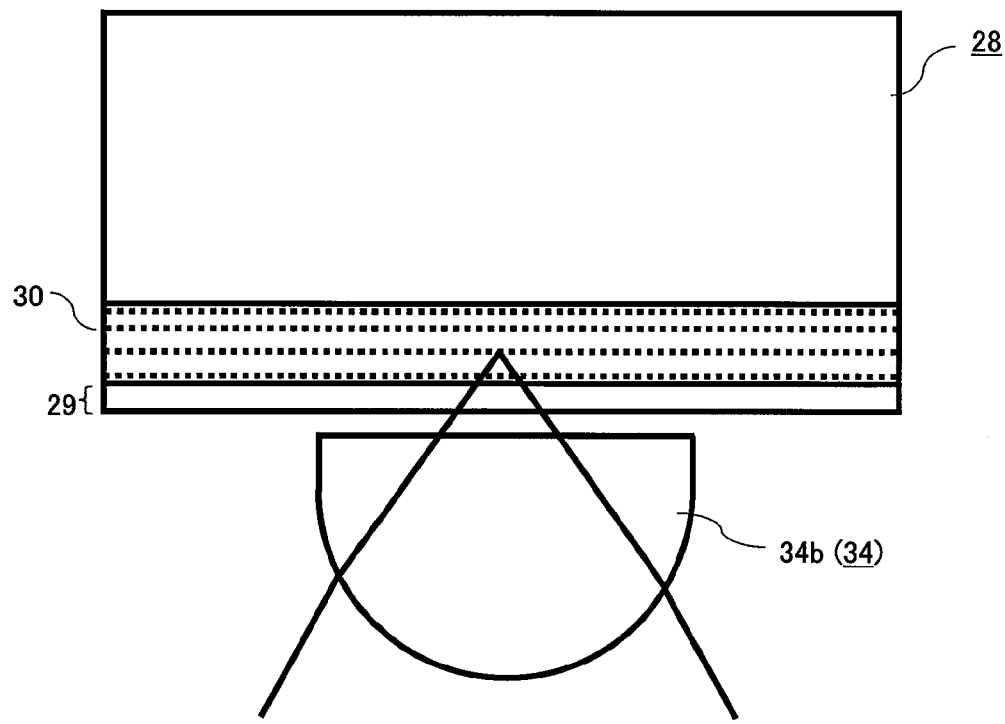
FIG. 2 is a schematic view showing in detail an objective lens system and an optical recording medium shown in FIG. 1.

FIG. 1 is a schematic view showing a configuration of an optical pickup device having an optical system for optical pickup according to a first embodiment of the present invention, and FIG. 2 is a schematic view showing in detail an objective lens system and an optical recording medium shown in FIG. 1.

An optical pickup device 1 includes a semiconductor laser 21, a collimator lens system 23, a beam splitter 25, a beam expander 33, an objective lens system 34, a detection lens 31, and a photo detector 32. Of these components, the collimator lens system 23 and the beam expander 33 are arranged in this order from the light source side, and form a wavefront conversion optical system that converts a wavefront of a light beam emitted from the semiconductor laser 21.

The semiconductor laser 21 emits diverging light 22 having a predetermined wavelength (e.g., 405 nm). The collimator lens system 23 converts the diverging light 22 emitted from the semiconductor laser 21, into parallel light 24. The parallel light 24 passes through the beam splitter 25 and enters the beam expander 33.

The beam expander 33 is disposed on an optical path of the parallel light 24 emitted from the collimator lens system 23, and is an optical system that converts the incident parallel light 24 into slightly-diverging light or slightly-converging light and causes the converted light to enter the objective lens system 34. Specifically, the beam expander 33 includes three lens elements, namely, a negative lens element 33a, a negative lens element 33b, and a positive lens element 33c (hereinafter, referred to merely as "lens element"). Further, in the present embodiment, the two lens elements 33a and 33b of the three lens elements are supported so as to be movable in a direction parallel to an optical axis, and the other lens element 33c is supported so as to be movable in a direction perpendicular to the optical axis. Movements of these lens elements 33a to 33c are controlled by actuators (not shown) or the like. Functions of the lens elements 33a to 33c will be described later.

The objective lens system 34 is a lens system with an NA (numerical aperture) exceeding 1, converges the incident light, and forms a spot within an optical recording medium 28. Specifically, the objective lens system 34 includes: a positive lens element 34a (hereinafter, referred to merely as "lens element") that converges the light beam emitted from the beam expander 33; and an S-SIL (super solid immersion lens) element 34b that further converges the light converged by the lens element 34a and emits evanescent light from its exit surface. The S-SIL element 34b has a super-hemispherical shape, and refracts the light beam incident on its incident surface, to converge the light beam on the exit surface. Because the S-SIL element 34b uses refraction at the incident surface, the NA of the lens element 34a used in combination with the S-SIL element 34b for constituting the objective lens system 34, can be low.

It is noted that, in order to simplify the optical system, the lens element 34a and the S-SIL element 34b may be fixed to one barrel (not shown).

Referring to FIG. 2, a plurality of recording layers 30 (dotted lines) each formed at a predetermined depth, and a protective layer 29 that covers a surface of the outermost recording layer 30, are provided in the optical recording medium 28. Each recording layer 30 has a characteristic that allows a part of light to pass therethrough and reflects the other part of the light. The recording layers 30 may be laminated at equal intervals or at predetermined intervals that are not equal intervals. Further, the protective layer 29 is provided so as to be able to protect information recorded on the recording layers 30 even when the objective lens system 34 collides against the optical recording medium 28 during use.

The S-SIL element 34b is disposed so as to create an air gap of about 20 nm between its exit surface and the protective layer 29 of such an optical recording medium 28. Due to the air gap, a state is provided, in which the S-SIL element 34b is not in contact with the optical recording medium 28 and the evanescent light emitted from the S-SIL element 34b is transmitted to the optical recording medium 28 without decaying. A method for controlling the air gap is not particularly limited, and various methods can be used. For example, an electrically-conductive thin film is formed on the exit surface of the S-SIL element 34b, and the air gap can be controlled on the basis of a measured value of a capacitance between the electrically-conductive thin film and the protective layer 29 opposed thereto.

Referring again to FIG. 1, the converging light emitted from the S-SIL element 34b passes through the protective layer 29 of the optical recording medium 28 and is focused on a desired recording layer 30. A part of the focused beam is reflected by the desired recording layer 30, passes through the objective lens system 34 and the beam expander 33, and enters the beam splitter 25.

The beam splitter 25 separates the light reflected by the optical recording medium 28, from an optical path extending from the semiconductor laser 21 to the optical recording medium 28. The light separated by the beam splitter 25 is converged by the detection lens 31, enters the photo detector 32, and is converted into an electrical signal corresponding to its intensity. On the basis of the electrical signal outputted from the photo detector 32, processes, such as: reading of information recorded on the optical recording medium 28; and tracking control, are performed.

Here, functions of the optical system for optical pickup according to the present embodiment will be described.

In the optical pickup device 1 according to the present embodiment, when two of the three lens elements that constitute the beam expander 33, namely, the lens elements 33a and 33b, are moved in the optical axis direction while the interval therebetween is changed, the light emitted toward the objective lens system 34 slightly diverges or converges, and hence the focal point of the beam within the recording layer 30 also changes. Therefore, by adjusting the interval between the lens elements 33a and 33b and the distance from the objective lens system 34, it is possible to focus on a desired recording layer 30 in a state where the interval between a surface of the optical recording medium 28 (namely, a surface of the protective layer 29) and the S-SIL element 34b disposed nearest to this surface is maintained constant.

However, in general, even when the focal point of the beam converged by the objective lens system is adjusted by the beam expander, there is a problem that residual spherical aberration is excessively great due to the different depths of the recording layers. For that reason, in the above Patent Document 1, a configuration in which a liquid crystal element is provided independently of a beam expander and the spherical aberration is independently compensated by the liquid crystal element, is used.

On the other hand, in the beam expander 33 according to the present embodiment, the focal point within the optical recording medium 28 can be adjusted and the spherical aberration can be compensated at the same time, by moving the lens elements 33a and 33b in the optical axis direction while the interval therebetween is changed. Thus, according to the present embodiment, it is unnecessary to additionally provide an optical element, such as a liquid crystal element, in order to compensate the spherical aberration caused by the difference in depth between the recording layers and the spherical aberration provided by the objective lens system, and a simple optical system and a simple optical pickup device can be realized.

Further, in general, in an optical pickup device, there is a problem that inclination of the optical recording medium and/or the optical system causes a coma aberration. However, in the optical system for optical pickup according to the present embodiment, the coma aberration can be also compensated. Specifically, the other lens element 33c of the lens elements that constitute the beam expander 33 is shifted in the direction perpendicular to the optical axis to change the positional relation between the lens element 33c and the light source. By so doing, a coma aberration of a spot on each recording layer is compensated in a state where the interval between the surface of the protective layer 29 and the S-SIL element 34b disposed nearest to this surface is maintained constant.

As described above, in the beam expander 33 according to the present embodiment, the focal point of the spot on the recording layer can be adjusted and the spherical aberration of the spot can be compensated at the same time, by individually moving the two lens elements 33a and 33b in the optical axis direction. In addition, the generated coma aberration can be also compensated by moving the other lens element 33c in the direction perpendicular to the optical axis. Thus, according to the present embodiment, a simple optical system for optical pickup can be realized without changing the working distance of the objective lens system 34 with respect to the optical recording medium 28 and also without using an additional element for compensating aberration. Such an optical system for optical pickup is useful particularly when the working distance of the objective lens system 34 needs to be strictly maintained within a certain range as in a near-field optical recording/reproducing method.

It is noted that different functions may be assigned to the two lens elements 33a and 33b as long as the two lens elements 33a and 33b can be used for adjusting the focal point and for compensating the spherical aberration.

Specifically, the beam expander can be designed such that only the spherical aberration can be compensated by moving one of these two lens elements (e.g., 33b) in the optical axis direction and such that the focal point of the spot can be adjusted and the spherical aberration of the spot can be adjusted by moving the other lens element (e.g., 33a) in the optical axis direction. When the optical system for optical pickup includes such lens elements 33a and 33b, compensation of the spherical aberration by the one lens element 33b, and adjustment of the focal point and compensation of the spherical aberration by the other lens element 33a, may be performed at the same time, or may be performed in turn or in a phased manner.

For example, the position of the lens element 33b is adjusted during a manufacturing process, to compensate spherical aberrations present in the optical system for optical pickup (e.g., a spherical aberration provided initially by each optical element, and a spherical aberration generated during the manufacturing process due to assembling errors of the optical system for optical pickup) to some extent. During operation of the optical pickup device, the other lens element 33a is driven to adjust the focal point of the spot and to compensate an aberration remaining in the optical system and a spherical aberration corresponding to the depth of the recording layer. In this case, it is only necessary to adjust the position of the lens element 33a during operation of the device. Thus, there is a merit that a mechanism of moving the lens element for adjusting the focus and for compensating the aberration can be easily formed by using one actuator.

It is noted that the functions of the lens elements that move in the optical axis direction do not necessarily need to be clearly separated from each other as described above. On the basis of the positional relation between each lens element and the objective optical system, the focal point may be adjusted and the spherical aberration may be compensated, not individually (namely, at the same time). In this case as well, adjustments of the positions of the lens elements that are movable in the optical axis direction, may be performed at the same time, or may be performed in turn or in a phased manner.

Second Embodiment

Figure 3:
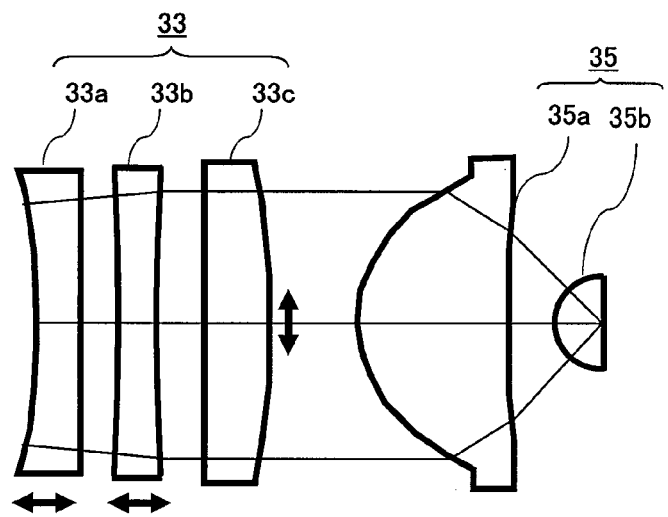
FIG. 3 is a schematic view showing a part of an optical system for optical pickup according to a second embodiment of the present invention.
Figure 4:
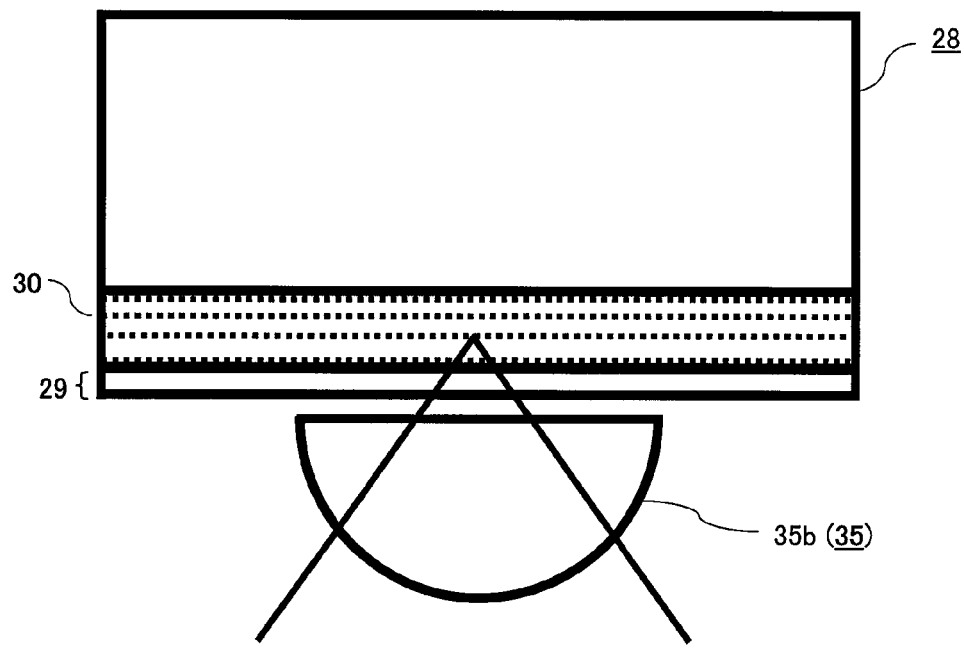
FIG. 4 is a schematic view showing in detail an objective lens system and an optical recording medium shown in FIG. 3.

FIG. 3 is a schematic view showing a part of an optical system for optical pickup according to a second embodiment of the present invention, and FIG. 4 is a schematic view showing in detail an objective lens system and an optical recording medium shown in FIG. 3.

The optical system for optical pickup according to the present embodiment includes a wavefront conversion optical system (a collimator lens system (not shown) and the beam expander 33) that is the same as that according to the first embodiment. However, the present embodiment differs from the first embodiment in that an objective lens system 35 is used instead of the objective lens system 34 according to the first embodiment. The following will mainly describe the difference between the present embodiment and the first embodiment.

The objective lens system 35 includes a positive lens element 35a (hereinafter, referred to merely as "lens element") that converges the light beam emitted from the beam expander 33, and a SIL (solid immersion lens) element 35b that further converges the light converged by the lens element 35a and emits evanescent light from its exit surface. The SIL element 35b has a substantially hemispherical shape, and converges the light beam having entered through its incident surface, on its exit surface without refracting the light beam.

In the present embodiment as well, by moving the two lens elements 33a and 33b for constituting the beam expander 33 in the optical axis direction, the focal point of the spot on the recording layer can be adjusted and the spherical aberration of the spot can be compensated at the same time, in a state where the distance between the surface of the optical recording medium and the SIL element 35b is maintained constant. In addition, by moving the other lens element 33c in the direction perpendicular to the optical axis, the generated coma aberration can be compensated in a state where the distance between the surface of the optical recording medium and the SIL element 35b is maintained constant.

Therefore, in the present embodiment as well, a simple optical system for optical pickup can be realized without changing the working distance of the objective lens system 35 and also without using an additional element for compensating aberration.

Third Embodiment

Figure 5:
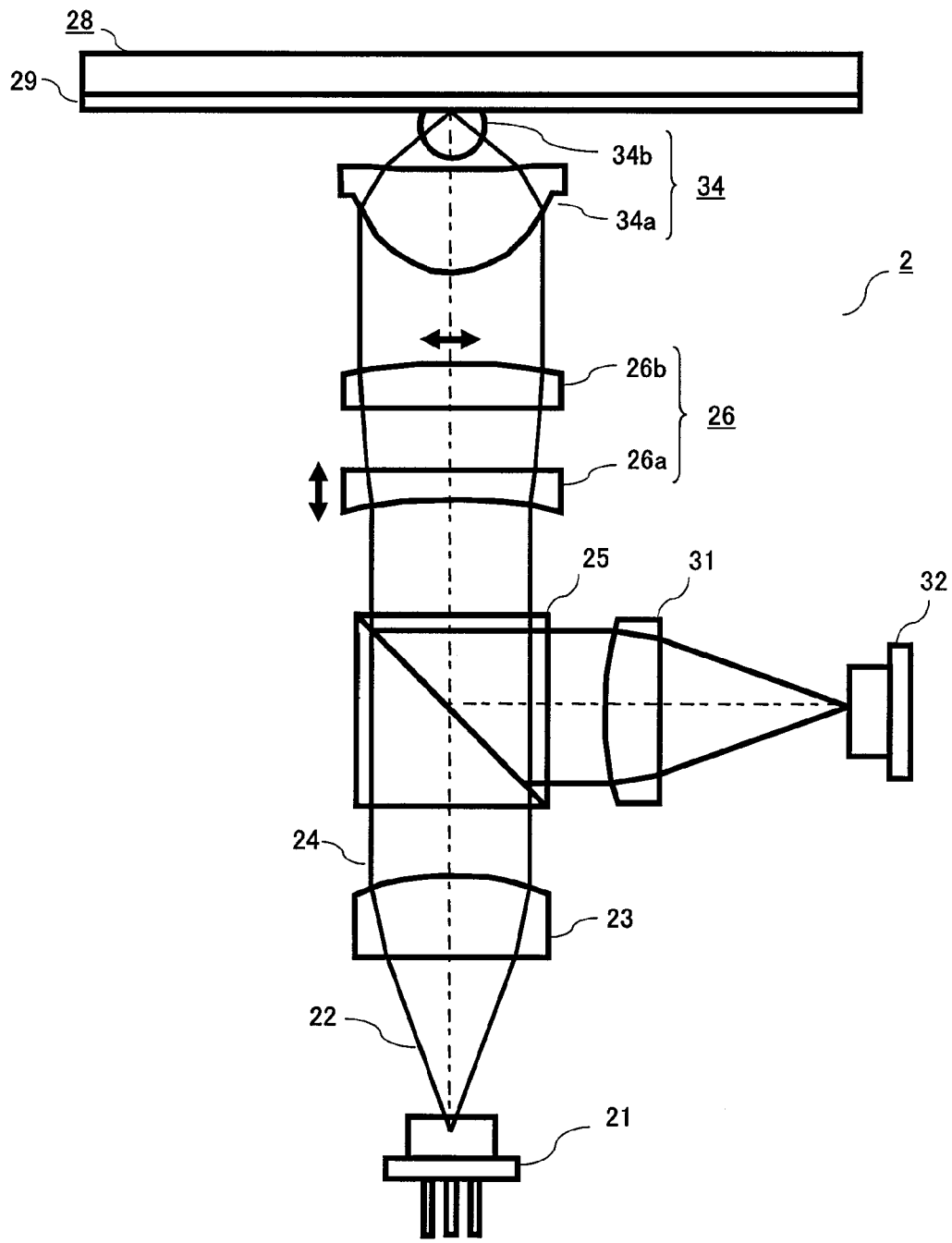
FIG. 5 is a schematic view showing a configuration of an optical pickup device having an optical system for optical pickup according to a third embodiment of the present invention.

FIG. 5 is a schematic view showing a configuration of an optical pickup device having an optical system for optical pickup according to a third embodiment of the present invention.

The optical pickup device 2 according to the present embodiment is the same in basic configuration as the optical pickup device 1 according to the first embodiment (FIG. 1), but differs from the optical pickup device 1 according to the first embodiment in that a beam expander 26 includes two lens elements. The following will mainly describe the difference between the present embodiment and the first embodiment.

The beam expander 26 includes two lens elements, namely, a negative lens element 26a and a positive lens element 26b (hereinafter, referred to merely as "lens element"). In the present embodiment, the lens element 26a is supported so as to be movable in the direction parallel to the optical axis, and the other lens element 26b is supported so as to be movable in the direction perpendicular to the optical axis. Movements of these lens elements 26a and 26b are controlled by actuators (not shown) or the like.

During operation of the optical pickup device 2 according to the present embodiment, when the lens element 26a is moved in the direction parallel to the optical axis to change the interval between the two lens elements 26a and 26b that constitute the beam expander 26, the light emitted toward the objective lens system 34 slightly diverges or converges, and hence the focal point of the beam within the recording layer 30 also changes. Therefore, by adjusting the interval between the lens elements 26a and 26b, it is possible to focus on the desired recording layer 30 in a state where the interval between the surface of the optical recording medium 28 (namely, the surface of the protective layer 29) and the S-SIL element 34b disposed nearest to this surface is maintained constant.

In addition, the beam expander 26 according to the present embodiment can adjust the focal point within the optical recording medium 28 and can compensate the spherical aberration at the same time, by changing the interval between the lens elements 26a and 26b. Thus, according to the present embodiment, it is unnecessary to additionally provide an optical element, such as a liquid crystal element, in order to compensate the spherical aberration caused by the difference in depth between the recording layers and the spherical aberration provided by the objective lens system, and a simple optical system and a simple optical pickup device can be realized.

Further, when the other lens element 26b is shifted in the direction perpendicular to the optical axis, the positional relation between the lens element 26b and the light source is changed. Thus, the coma aberration of the spot on each recording layer can be compensated in a state where the interval between the surface of the protective layer 29 and the S-SIL element 34b disposed nearest to this surface is maintained constant.

As described above, the beam expander 33 according to the present embodiment can adjust the focal point of the spot on the recording layer and can compensate the spherical aberration of the spot at the same time, by moving the lens element 26a in the optical axis direction. The beam expander 33 can also compensate the generated coma aberration by moving the other lens element 26b in the direction perpendicular to the optical axis. Thus, according to the present embodiment, a simple optical system for optical pickup can be realized without changing the working distance of the objective lens system 34 with respect to the optical recording medium 28 and also without using an additional element for compensating aberration.

Fourth Embodiment

Figure 6:
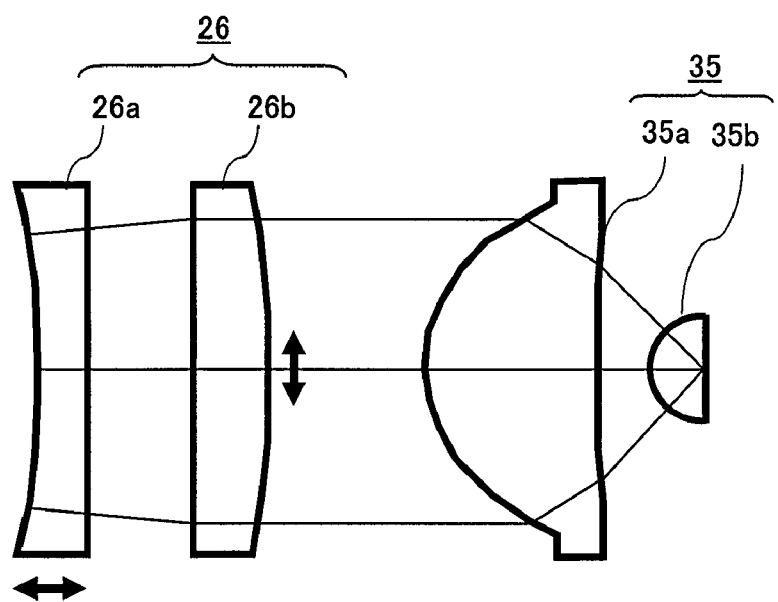
FIG. 6 is a schematic view showing a part of an optical system for optical pickup according to a fourth embodiment of the present invention.

FIG. 6 is a schematic view showing a part of an optical system for optical pickup according to a fourth embodiment of the present invention.

The optical system for optical pickup according to the present embodiment includes a wavefront conversion optical system (a collimator lens system (not shown) and the beam expander 26) that is the same as that according to the third embodiment. However, the present embodiment differs from the third embodiment in that the objective lens system 35 is used instead of the objective lens system 34.

As described above, the objective lens system 35 includes the positive lens element 35a (hereinafter, referred to merely as "lens element") that converges the light beam emitted from the beam expander 33, and the SIL (solid immersion lens) element 35b that further converges the light converged by the lens element 35a and emits the evanescent light from its exit surface. In addition, the SIL element 35b has a substantially hemispherical shape, and converges the light beam having entered through its incident surface, on its exit surface without refracting the light beam.

In the present embodiment as well, the focal point of the spot on the recording layer can be adjusted and the spherical aberration of the spot can be compensated at the same time, by moving the lens element 26a for constituting the beam expander 26, and the generated coma aberration can be compensated by moving the other lens element 26b in the direction perpendicular to the optical axis. Thus, according to the present embodiment as well, a simple optical system for optical pickup can be realized without changing the working distance of the objective lens system 35 with respect to the optical recording medium 28 and also without using an additional element for compensating aberration.

(Conditions)

Here, conditions that should be met by the beam expanders in the optical systems for optical pickup according to the aforementioned first to fourth embodiments, will be described.

Where:

DF indicates a defocus component generated by movement of a lens element for constituting the beam expander;

S3 indicates a third-order spherical aberration component; and

S5 indicates a fifth-order spherical aberration compensation component, the optical systems for optical pickup according to the aforementioned first to fourth embodiments meet preferably at least one of, and desirably both of, the following conditions (1) and (2).

$$0.05 < |S3/DF| < 0.20 \quad (1)$$

$$0.10 < |S5/S3| < 0.50 \quad (2)$$

In the case where the range of the condition (1) is not met, when moving the lens element for constituting the beam expander, the sensitivity of a third-order spherical aberration generated due to the movement of the lens element becomes inappropriate. Thus, it is impossible to adjust the focal point of the spot on the recording layer and to compensate the spherical aberration of the spot at the same time by the movement of the lens element.

In the case where the range of the condition (2) is not met, the balance between a third-order spherical aberration and a fifth-order spherical aberration deteriorates, and the aberration cannot be compensated appropriately even when the lens element for constituting the beam expander is moved. Thus, it is impossible to adjust the focal point of the spot on the recording layer and to compensate the spherical aberration of the spot at the same time by the movement of the lens element.

Other Modified Embodiments

Each of the above first and second embodiments has described the case where the beam expander includes the two negative lens elements and the one positive lens element which are arranged in this order from the light source side. However, the combination of the power and the arrangement of the lens elements that constitute the beam expander may be a combination other than this case.

In addition, each of the above first and second embodiments has described the case where the two lens elements, on the light source side, for constituting the beam expander are movable in the optical axis direction. However, another combination of two lens elements (namely, the two lens elements on the objective lens system side, or the one lens element on the light source side and the one lens element on the objective lens system side) may be movable in the optical axis direction.

Further, each of the above first and second embodiments has described the case where two of the three lens elements that constitute the beam expander are movable in the optical axis direction. However, only one lens element or all the three lens elements may be movable in the optical axis direction.

Further, in each of the above first and second embodiments, one of the three lens elements that constitute the beam expander is supported so as to be movable in the direction perpendicular to the optical axis. However, when it is unnecessary to compensate the coma aberration at the beam expander, it is only necessary to fix the lens element that does not move in the optical axis direction, so as not to move also in the direction perpendicular to the optical axis.

Further, in each of the above first and second embodiments, of the three lens elements that constitute the beam expander, the one lens elements disposed nearest to the objective optical system is supported so as to be movable in the direction perpendicular to the optical axis. One of the other two lens elements may be moved in the direction perpendicular to the optical axis to compensate the coma aberration.

Further, each of the above third and fourth embodiments has described the case where the beam expander includes the negative lens element on the light source side and the positive lens element on the objective lens side. However, the combination of the power and the arrangement of the lens elements that constitute the beam expander may be a combination other than this case.

Further, each of the above third and fourth embodiments has described the case where, of the two lens elements that constitute the beam expander, the one lens element disposed on the light source side is movable in the optical axis direction. However, only the other lens element, or both lens elements, may be movable in the optical axis direction.

Further, in each of the above third and fourth embodiments, one of the two lens elements that constitute the beam expander is supported so as to be movable in the direction perpendicular to the optical axis. However, when it is unnecessary to compensate the coma aberration at the beam expander, it is only necessary to fix the lens that does not move in the optical axis direction, so as not to be moved also in the direction perpendicular to the optical axis.

Further, in each of the above third and fourth embodiments, of the two lens elements that constitute the beam expander, the one lens element disposed nearest to the objective optical system is supported so as to be movable in the direction perpendicular to the optical axis. However, the other lens element may be moved in the direction perpendicular to the optical axis to compensate the coma aberration.

Further, each of the above first to fourth embodiments has described the case where the wavefront conversion optical system includes the collimator lens system and the beam expander. However, the optical system does not necessarily need to include the combination of them. The optical system only necessarily includes one of: or both of: a lens element that can be moved in the optical axis direction to adjust the focal point of the spot and to compensate the spherical aberration of the spot; and a lens element that can be moved in the direction perpendicular to the optical axis to compensate the coma aberration.

Further, each of the above first to fourth embodiments has described the case where the beam expander included in the wavefront conversion optical system includes a plurality of lens elements. However, the function of at least one of the lens elements may be performed by the collimator lens system. For example, the light to be emitted from the collimator lens system may be changed from the parallel light to substantially diverging light, and an optical system in which a positive lens element converts the diverging light into parallel light, may be formed. In this case, by moving the collimator lens system or the positive lens element in the optical axis direction, it is possible to adjust the focal point of the light emitted from the objective lens and to compensate the spherical aberration of the light. In addition, in order to compensate the coma aberration, the collimator lens system may be moved in the direction perpendicular to the optical axis.

Further, in each of the above first to fourth embodiments, the shapes of the SIL element and the S-SIL element are specified. However, a SIL element having another shape, and an S-SIL element having another shape, can be similarly used.

Further, in each of the above first to fourth embodiments, the objective lens system including the SIL element or the S-SIL element is used as an objective optical system. However, a SIM (solid immersion mirror) element that has at least one reflecting surface and emits evanescent light toward the optical recording medium, may be used instead of the objective lens system. For example, the configuration disclosed in Japanese Patent No. 3436175 can be used for the SIM and the objective optical system including the SIM.

Further, each of the above first to fourth embodiments has described the case where the objective optical system includes the two lens elements. However, the objective optical system may include three or more lens elements, or may include the reflecting surface of the above SIM or the like, and one lens element.

Further, in each of the above first to fourth embodiments, optical elements included in the collimator lens system are not specified. However, as long as the collimator lens system can convert the diverging light emitted from the light source into parallel light, the number and the type of the elements of the collimator lens system are not particularly limited.

Further, the optical system for optical pickup according to each of the above first to fourth embodiments, and the optical pickup device having the optical system, can be naturally used for performing reading, writing, and erasing on an optical recording medium having a single recording layer, as well as on an optical recording medium having multiple recording layers.

Further, the optical recording medium having multiple recording layers may be any optical recording medium such as a rewritable phase-change optical disc, a read-only optical disc (ROM), and a magneto-optical disk (MO), as long as it is irradiated with light for at least one of reading, writing, and erasing of information. Media of various standards can be used.

Further, the multilayer optical recording medium is not limited to a disc-shaped medium, and may have another shape. For example, the present invention is similarly applicable to the case where the near-field optical recording/reproducing method is used for a multilayer optical recording medium having a card shape or a solid (bulk) shape.

Fifth Embodiment

Figure 7:
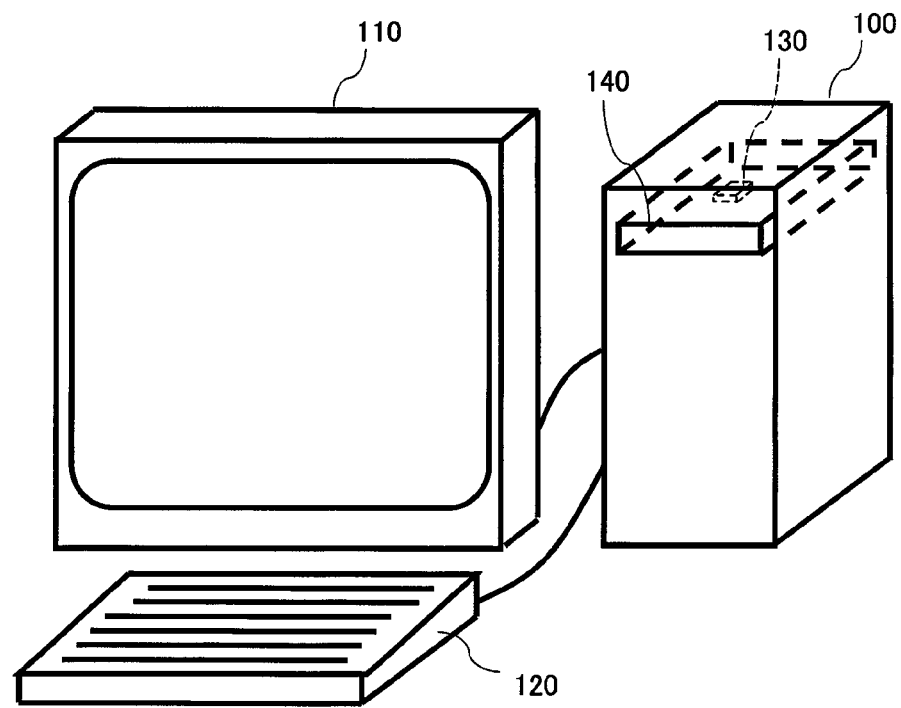
FIG. 7 is a schematic view of a personal computer system according to a fifth embodiment of the present invention.

FIG. 7 is a schematic view of a personal computer system according to a fifth embodiment.

The personal computer system according to the present embodiment includes a computer 100, a liquid crystal display (output device) 110, and a keyboard (input device) 120. The computer 100 includes an optical disc device 140 that includes an optical pickup device 130 according to the first embodiment. Because the personal computer system according to the present embodiment includes the optical pickup device 130 according to the first embodiment, the personal computer system can perform reading and writing of data on a nonconventional high-capacity optical recording medium.

It is noted that the optical pickup device having the optical system according to any one of the second to fourth embodiments may be used instead of the optical pickup device 130 according to the first embodiment.

Sixth Embodiment

Figure 8:
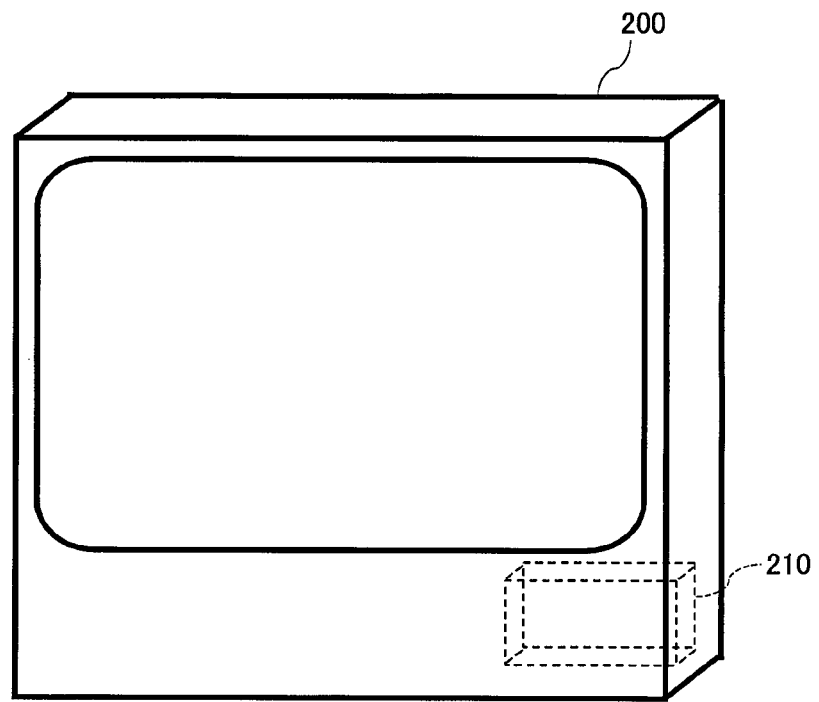
FIG. 8 is a schematic view of a video output device according to a sixth embodiment of the present invention.

FIG. 8 is a schematic view of a video output device according to a sixth embodiment.

The video output device according to the present embodiment includes a main body 200 and an optical pickup device 210 according to the first embodiment which is included in the main body. Because the video output device according to the present embodiment includes the optical pickup device 210 according to the first embodiment, the video output device can perform reading and writing of data on a nonconventional high-capacity optical recording medium.

It is noted that the optical pickup device having the optical system according to any one of the second to fourth embodiments may be used instead of the optical pickup device 210 according to the first embodiment.

NUMERICAL EXAMPLES

The following will describe specific numerical examples for the optical systems for optical pickup according to the first to fourth embodiments. In each example, the case is assumed, where the thickness of the protective layer 29 of the optical recording medium 28 is 2.5 μm and further three recording layers 30 are provided at positions of depths of 0 μm, 4 μm, and 8 μm, respectively, from the boundary with the protective layer 29.

Further, an aspherical shape is defined by the following mathematical formula 1.

$$Z = \frac{h^2/r}{1+\sqrt{1-(1+\kappa(h/r)^2}} + \sum A_n h^n \quad \text{[Mathematical Formula 1]}$$

Here, the symbols in the formula indicate the following quantities:

Z is the distance from an on-the-aspheric-surface point at a height h relative to the optical axis to a tangential plane at the top of the aspheric surface;

h is the height relative to the optical axis;

r is the radius of curvature at the top;

k is the conic constant; and

An is the n-th order aspheric coefficient.

Example 1

In Example 1, an optical system for optical pickup is designed such that: the wavelength of the light source is 405 nm; the NA of the objective lens system is 1.7; and the focal length of the objective lens system is 1.676 mm. The optical system for optical pickup according to the present example includes: the beam expander including three lens elements; and the objective lens system including an S-SIL element.

Table 1 shows the lens data of the optical system for optical pickup according to Example 1 (excluding the collimator lens system), and Table 2 shows the aspherical data of the first surface and the third to eighth surfaces of the lens elements shown in Table 1.

TABLE 1

|  | Surface No. | r (mm) | d (mm) | n (405 nm) | Remarks |
|---|---|---|---|---|---|
| Object surface | 0 | ∞ |  |  |  |
| L1 | 1 | −16.828 | 1 | 1.62392 | Aspherical |
|  | 2 | ∞ | 2 |  | Planar |
| L2 | 3 | −138.445 | 1.2 | 1.62392 | Aspherical |
|  | 4 | −59.331 | 2 |  | Aspherical |
| L3 | 5 | 317.520 | 1.5 | 1.62392 | Aspherical |
|  | 6 | −27.032 | 3 |  | Aspherical |
| L4 | 7 | 4.522 | 1.8 | 1.62392 | Aspherical |
|  | 8 | −321.5208 | 0.09515206 |  | Aspherical |
| L5 | 9 | 1.95 | 2.884958 | 2.06820 | Spherical |
|  | 10 | ∞ | 0 |  | Planar |
| Cover layer | 11 | ∞ | 0.0025 | 1.90000 | Planar |
| Recording layer | 12 | ∞ | 0.004 | 1.90000 | Planar |
| Image surface | 13 | ∞ |  |  |  |

TABLE 2

|  | 1st surface | 3rd surface | 4th surface | 5th surface | 6th surface | 7th surface | 8th surface |
|---|---|---|---|---|---|---|---|
| k | 2.753533E+01 | −3297.827 | 1.404210E+02 | −2.010934E+01 | −2.010934E+01 | −8.278030E−01 | 0.000000E+00 |
| A2 | 0.000000E+00 | 0.000000E+00 | 0.000000E+00 | 0.000000E+00 | 0.000000E+00 | 0.000000E+00 | 0.000000E+00 |
| A4 | 5.288916E−04 | 1.655585E−04 | −4.538522E−05 | −3.068745E−05 | 1.149060E−04 | 6.981059E−04 | 7.651732E−04 |
| A6 | 8.824794E−05 | 1.166554E−04 | −2.667371E−05 | −2.504494E−06 | 6.272393E−05 | −1.658536E−05 | −1.129876E−04 |
| A8 | −1.375575E−05 | 5.790189E−06 | 5.051009E−06 | −2.846253E−07 | 5.379741E−06 | 2.296561E−07 | 1.268292E−05 |
| A10 | 2.364419E−06 | −3.698014E−07 | 4.494047E−07 | −4.555605E−09 | −7.884218E−07 | 2.328891E−07 | −3.603807E−07 |
| A12 | −8.370003E−08 | −1.054530E−08 | 2.184841E−08 | −2.065733E−08 | 1.917435E−08 | 0.000000E+00 | 0.000000E+00 |
| A14 | −1.758124E−09 | −4.757769E−10 | −4.784268E−09 | 2.190139E−09 | −1.731133E−10 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |

Figure 9:
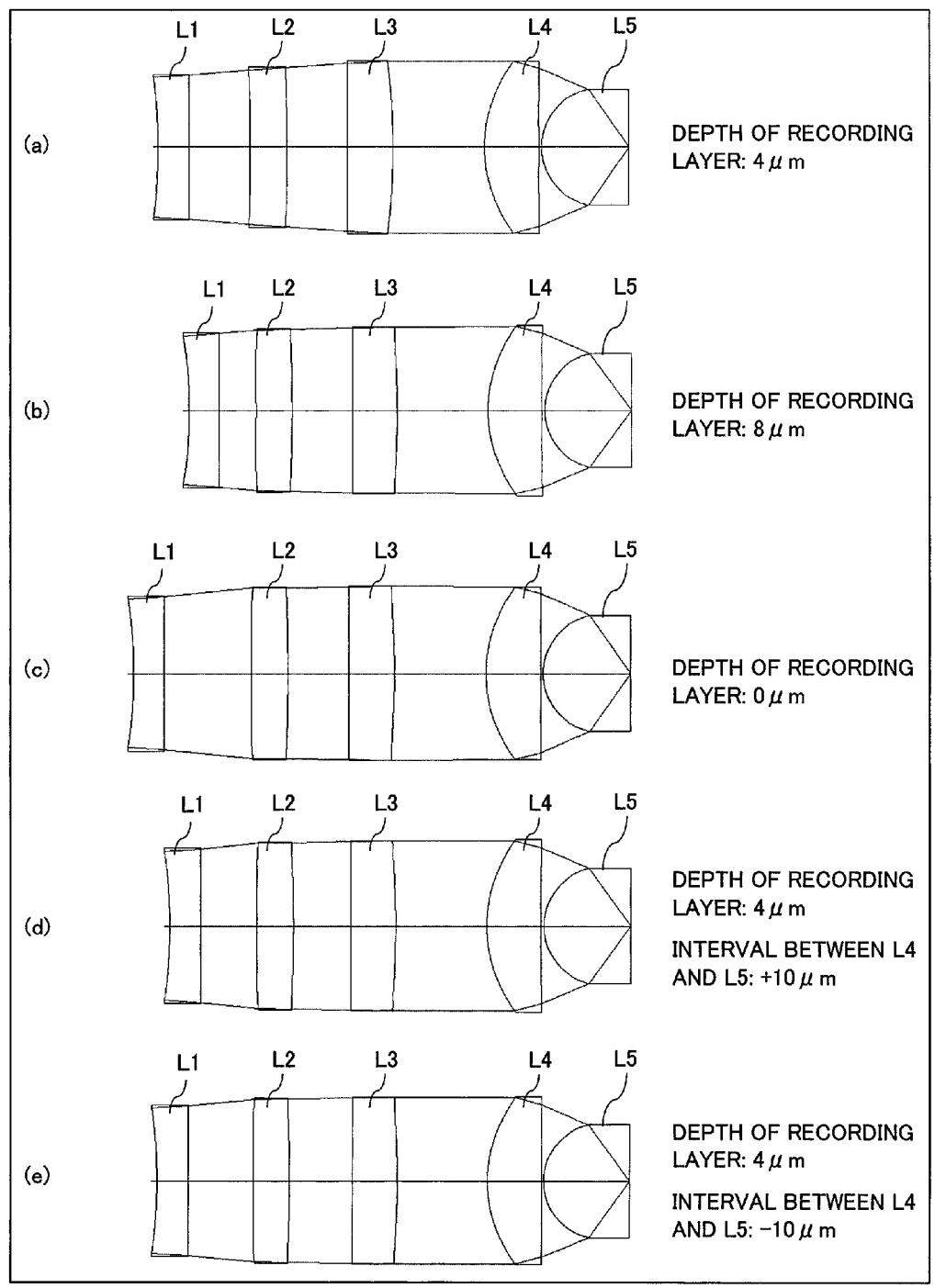
FIG. 9 illustrates optical path diagrams of an optical system for optical pickup according to Example 1.
Figure 10:
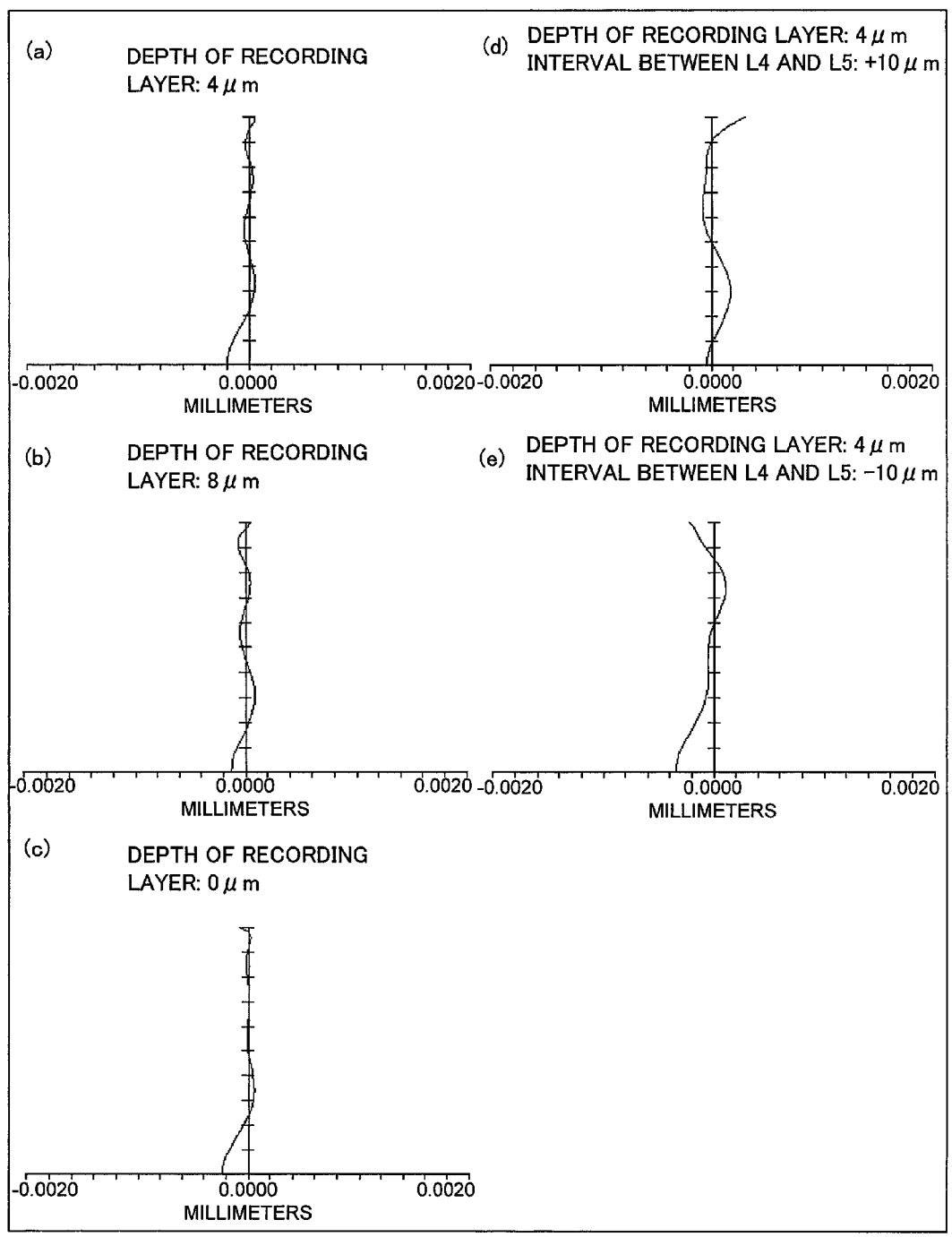
FIG. 10 illustrates graphs showing spherical aberrations of the optical system for optical pickup according to Example 1.

In addition, FIG. 9 illustrates optical path diagrams of the optical system for optical pickup according to Example 1, and FIG. 10 illustrates graphs showing spherical aberrations of the optical system for optical pickup according to Example 1. In FIGS. 9 and 10, (a) corresponds to a state where focusing is performed on the recording layer at a depth of 4 μm; (b) corresponds to a state where focusing is performed on the recording layer at a depth of 8 μm; and (c) corresponds to a state where focusing is performed on the recording layer at a depth of 0 μm. In addition, (d) corresponds to a state where focusing is performed on the recording layer at a depth of 4 μm in the case where the distance between the lens elements L4 and L5 that constitute the objective lens system is larger than a designed value by 10 μm; and (e) corresponds to a state where focusing is performed on the recording layer at a depth of 4 μm in the case where the distance between the lens elements L4 and L5 that constitute the objective lens system is smaller than the designed value by 10 μm.

Further, Table 3 shows the positional relation among the lens elements L1 to L3 that constitute the beam expander, and the correspondence relation between the distance between the lens elements L4 and L5 and the depth of a to-be-focused recording layer. It is noted that the last two rows in Table 3 corresponds to (d) and (e) in FIGS. 9 and 10, respectively.

TABLE 3

|  | Distance between L1 and L2 (mm) | Distance between L2 and L3 (mm) | Distance between L4 and L5 (mm) | Depth of recording layer (mm) |
|---|---|---|---|---|
| Surface No. | 2 | 4 | 8 | 10 |
| Recording layer 4 μm | 2.0000 | 2.0000 | 0.08515206 | 0.004 |
| Recording layer 8 μm | 1.2000 | 2.0000 | 0.08515206 | 0.008 |
| Recording layer 0 μm | 2.829818 | 2.0000 | 0.08515206 | 0.000 |
| Recording layer 4 μm Distance between L4 and L5: +10 μm | 1.836852 | 1.885508 | 0.09515206 | 0.004 |
| Recording layer 4 μm Distance between L4 and L5: −10 μm | 2.166361 | 2.113931 | 0.07515206 | 0.004 |

As shown in Table 3, the spot within the optical recording medium can be formed on a desired recording layer by changing the distance between the two lens elements L1 and L2 on the light source side. In addition, as shown in FIGS. 10(a) to (c), the focal point can be adjusted and the spherical aberration can be compensated at the same time, by changing the distance between the lens elements L1 and L2.

Further, FIGS. 9(d) and (e) show states where the distance between the lens elements L4 and L5 that constitute the objective lens system deviates from the designed value due to assembling errors during manufacturing. Due to the deviation of the distance between the lens elements L4 and L5, the spherical aberration of the objective lens system changes. In this case as well, as shown in Table 3 (the last two rows) and FIGS. 10(d) and (e), by moving the lens elements L1 and L2 in the direction parallel to the optical axis, it is possible to adjust the focal point of the spot and to compensate the spherical aberration of the spot at the same time.

Figure 11:
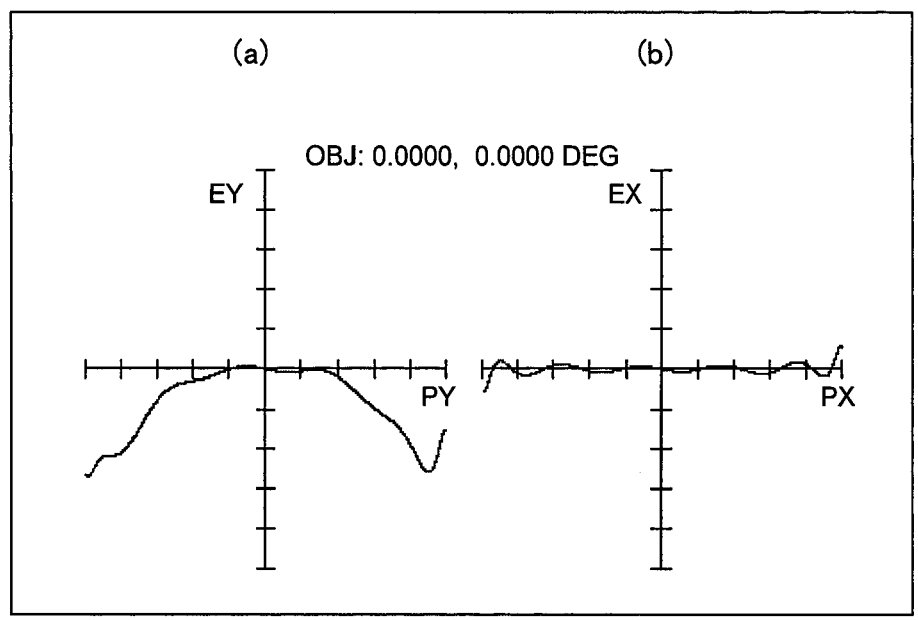
FIG. 11 illustrates graphs showing lateral aberrations of the optical system for optical pickup according to Example 1.
Figure 12:
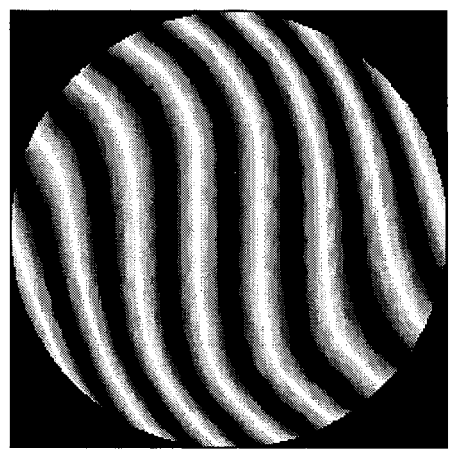
FIG. 12 shows interference fringes appearing when compensating a coma aberration of the optical system for optical pickup according to Example 1.

FIGS. 11(a) and (b) are aberration diagrams (light beam aberration) when the lens element L3 is moved in the direction perpendicular to the optical axis by 5 μm, and show an aberration in the moving direction of the lens element L3 and an aberration in a direction perpendicular to the moving direction, respectively. In addition, FIG. 12 shows interference fringes appearing when the lens element L3 is moved in the direction perpendicular to the optical axis to compensate a coma aberration.

When the lens element L3 is moved in the direction perpendicular to the optical axis by 1 μm, a third-order coma aberration of 18 mλ occurs. When the lens element L3 is moved in the direction perpendicular to the optical axis by 5 μm, a third-order coma aberration of 92 mλ occurs. The value of the generated coma aberration changes substantially linearly with respect to the movement amount of the lens element L3. On the other hand, when the lens element L3 is moved by 5 μm, aberrations other than the third-order coma aberration are equal to or less than 10 mλ. In other words, it is recognized that, when the lens element L3 is moved in the direction perpendicular to the optical axis, the change amount of the third-order coma aberration is sufficiently great as compared to that of the other aberrations. Thus, when a third-order coma aberration occurs due to inclination of the optical recording medium and/or the lens, or the like, it is possible to compensate only the third-order coma aberration without greatly changing the other aberrations, by controlling the movement amount of the lens element L3 so as to cancel the generated third-order coma aberration.

Further, compensation of the third-order coma aberration can be achieved by moving the lens element L1 in the direction perpendicular to the optical axis, instead of the lens element L3. This case will be described below.

Figure 13:
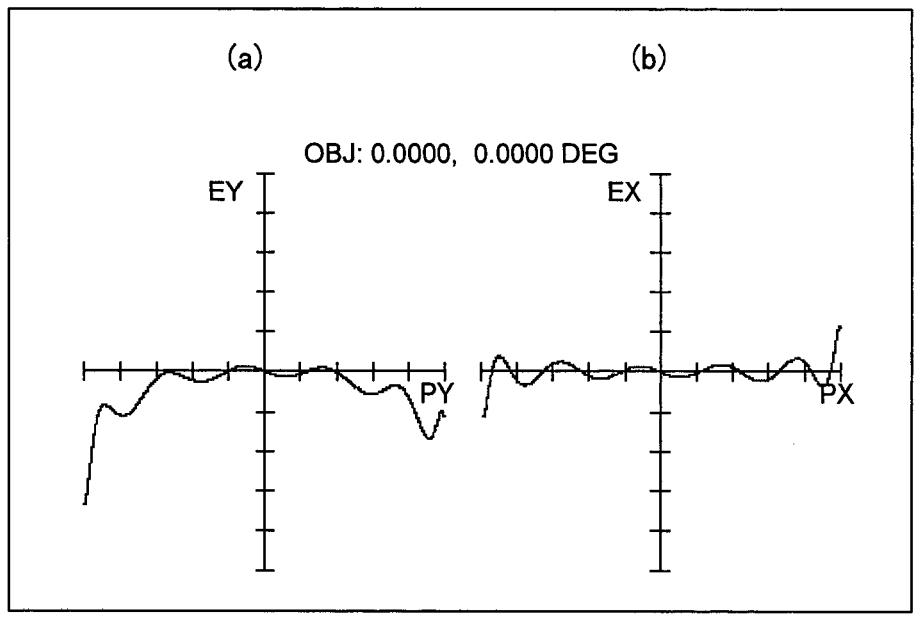
FIG. 13 illustrates graphs showing lateral aberrations of the optical system for optical pickup according to Example 1.
Figure 14:
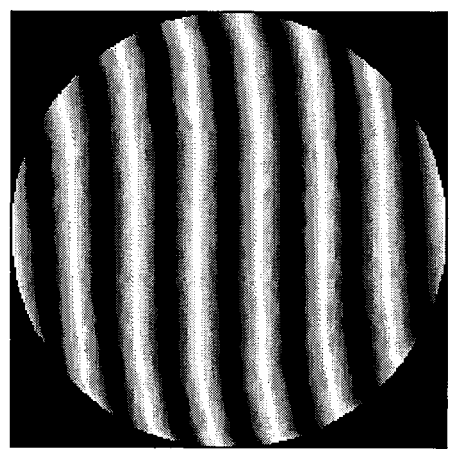
FIG. 14 shows interference fringes appearing when compensating a coma aberration of the optical system for optical pickup according to Example 1.

FIGS. 13(a) and (b) are aberration diagrams (light beam aberration) when the lens element L1 is moved in the direction perpendicular to the optical axis by 5 μm, and show an aberration in the moving direction of the lens element L1 and an aberration in a direction perpendicular to the moving direction, respectively. In addition, FIG. 14 shows interference fringes appearing when the lens element L1 is moved in the direction perpendicular to the optical axis to compensate a coma aberration.

When the lens element L1 is moved in the direction perpendicular to the optical axis by 1 μm, a third-order coma aberration of 4.3 mλ occurs. When the lens element L1 is moved in the direction perpendicular to the optical axis by 5 μm, a third-order coma aberration of 22 mλ occurs. The value of the generated coma aberration changes substantially linearly with respect to the movement amount of the lens element L1. On the other hand, when the lens element L1 is moved by 5 μm, aberrations other than the third-order coma aberration are equal to or less than 10 mλ. In other words, it is recognized that, even when the lens element L1 is moved in the direction perpendicular to the optical axis, the change amount of the third-order coma aberration is sufficiently great as compared to that of the other aberrations. Therefore, although the change amount of the third-order coma aberration with respect to the movement amount of the lens element L1 is slightly smaller than that of the third-order coma aberration with respect to the movement amount of the lens element L3, only the third-order coma aberration can be compensated without greatly changing the other aberrations, also by moving the lens element L1 in the direction perpendicular to the optical axis.

Example 2

In Example 2, an optical system for optical pickup is designed such that: the wavelength of the light source is 405 nm; the NA of the objective lens system is 1.7; and the focal length of the objective lens system is 1.9 mm. The optical system for optical pickup according to the present example includes: the beam expander including three lens elements; and the objective lens system including a SIL element.

Table 4 shows the lens data of the optical system for optical pickup according to Example 2 (excluding the collimator lens system), and Table 5 shows the aspherical data of the first surface, the third and fourth surfaces, and the sixth to eighth surfaces of the lens elements shown in Table 4.

TABLE 41

|  | Surface No. | r (mm) | d (mm) | n (405 nm) | Remarks |
|---|---|---|---|---|---|
| Object surface | 0 |  | ∞ |  |  |
| L1 | 1 | −19.48508 | 1 | 1.62392 | Aspherical |
|  | 2 | ∞ | 2 |  | Planar |
| L2 | 3 | −68.47887 | 1.2 | 1.62392 | Aspherical |
|  | 4 | −83.73539 | 2 |  | Aspherical |
| L3 | 5 | ∞ | 1.5 | 1.62392 | Planar |
|  | 6 | −22.53263 | 3 |  | Aspherical |
| L4 | 7 | 2.752362 | 3.4 | 1.61642 | Aspherical |
|  | 8 | −439.2431 | 0.9844065 | 2.06820 | Aspherical |
|  | 9 | 1 | 0.9956205 |  | Spherical |
| L5 | 10 | ∞ | 0 |  | Planar |
| Cover layer | 11 | ∞ | 0.0025 | 1.90000 | Planar |
| Recording layer | 12 | ∞ | 0.004 | 1.90000 | Planar |
| Image surface | 13 | ∞ |  |  |  |

TABLE 5

|  | 1st surface | 3rd surface | 4th surface | 6th surface | 7th surface | 8th surface |
|---|---|---|---|---|---|---|
| k | 2.865644E+01 | 1.666979E+01 | 4.054043E+00 | 6.944152E+00 | −5.904042E−01 | 0.000000E+00 |
| A2 | 0.000000E+00 | 0.000000E+00 | 0.000000E+00 | 0.000000E+00 | 0.000000E+00 | 0.000000E+00 |
| A4 | 2.319795E−04 | −8.028842E−05 | −5.725152E−05 | −8.731081E−05 | 8.219162E−04 | 5.233926E−03 |
| A6 | 3.536129E−05 | 3.935767E−06 | 5.813229E−06 | 1.003977E−05 | 5.003009E−05 | −2.000501E−04 |
| A8 | −2.781270E−06 | −4.859439E−07 | 1.947350E−07 | −6.564255E−07 | 5.050679E−06 | −4.731149E−05 |
| A10 | 1.791648E−07 | 0.000000E+00 | 3.326921E−09 | 1.551253E−08 | 3.528352E−08 | −2.325174E−06 |

TABLE 5-continued

|     | 1st surface   | 3rd surface   | 4th surface   | 6th surface   | 7th surface    | 8th surface    |
| --- | ------------- | ------------- | ------------- | ------------- | -------------- | -------------- |
| A12 | 0.000000E+00  | 0.000000E+00  | 0.000000E+00  | 0.000000E+00  | 1.402773E−08   | 2.028821E−06   |
| A14 | 0.000000E+00  | 0.000000E+00  | 0.000000E+00  | 0.000000E+00  | 4.429027E−09   | −2.248673E−07  |
| A16 | 0.000000E+00  | 0.000000E+00  | 0.000000E+00  | 0.000000E+00  | −4.631051E−10  | 8.084586E−09   |

Figure 15:
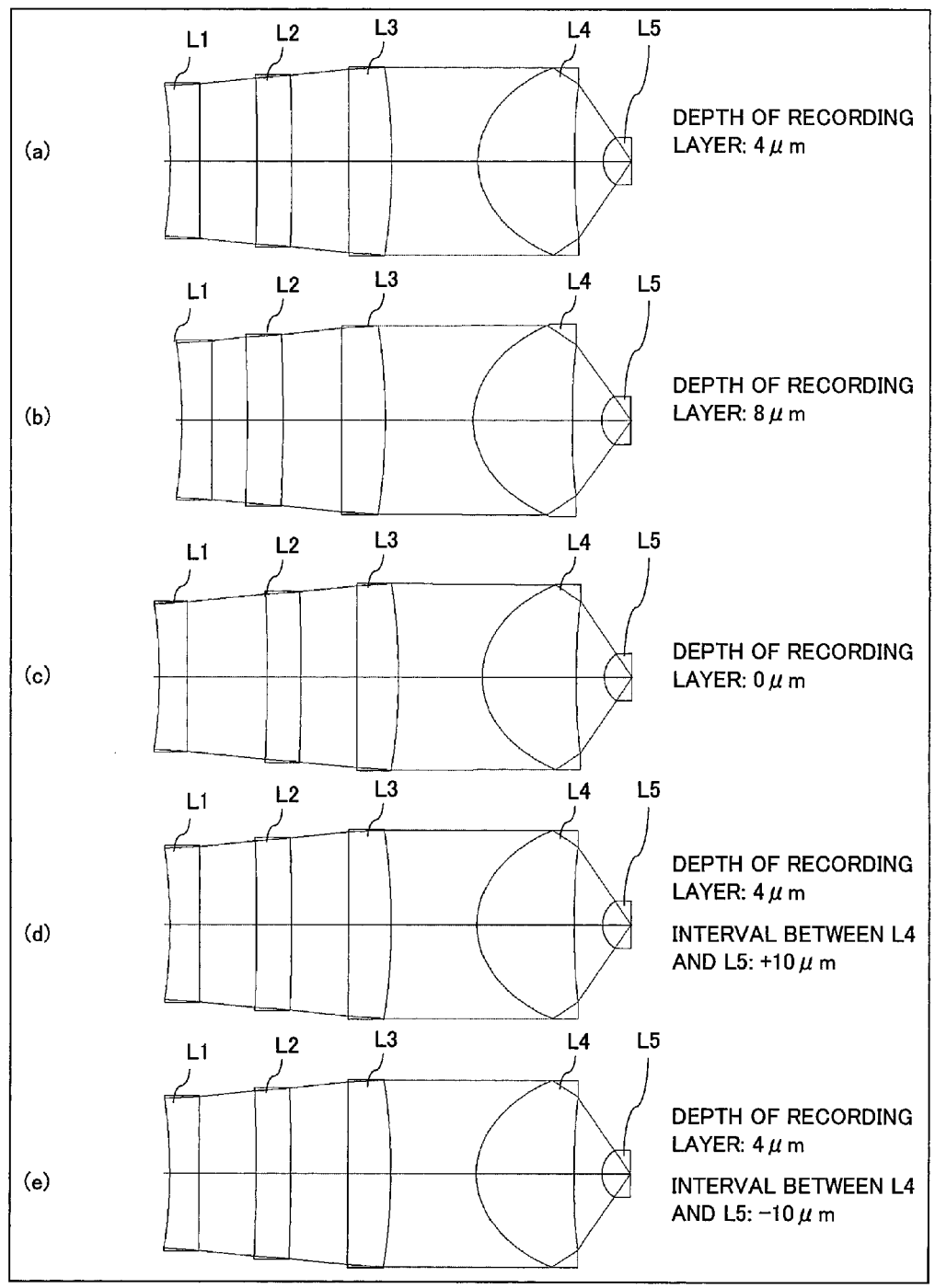
FIG. 15 illustrates optical path diagrams of an optical system for optical pickup according to Example 2.
Figure 16:
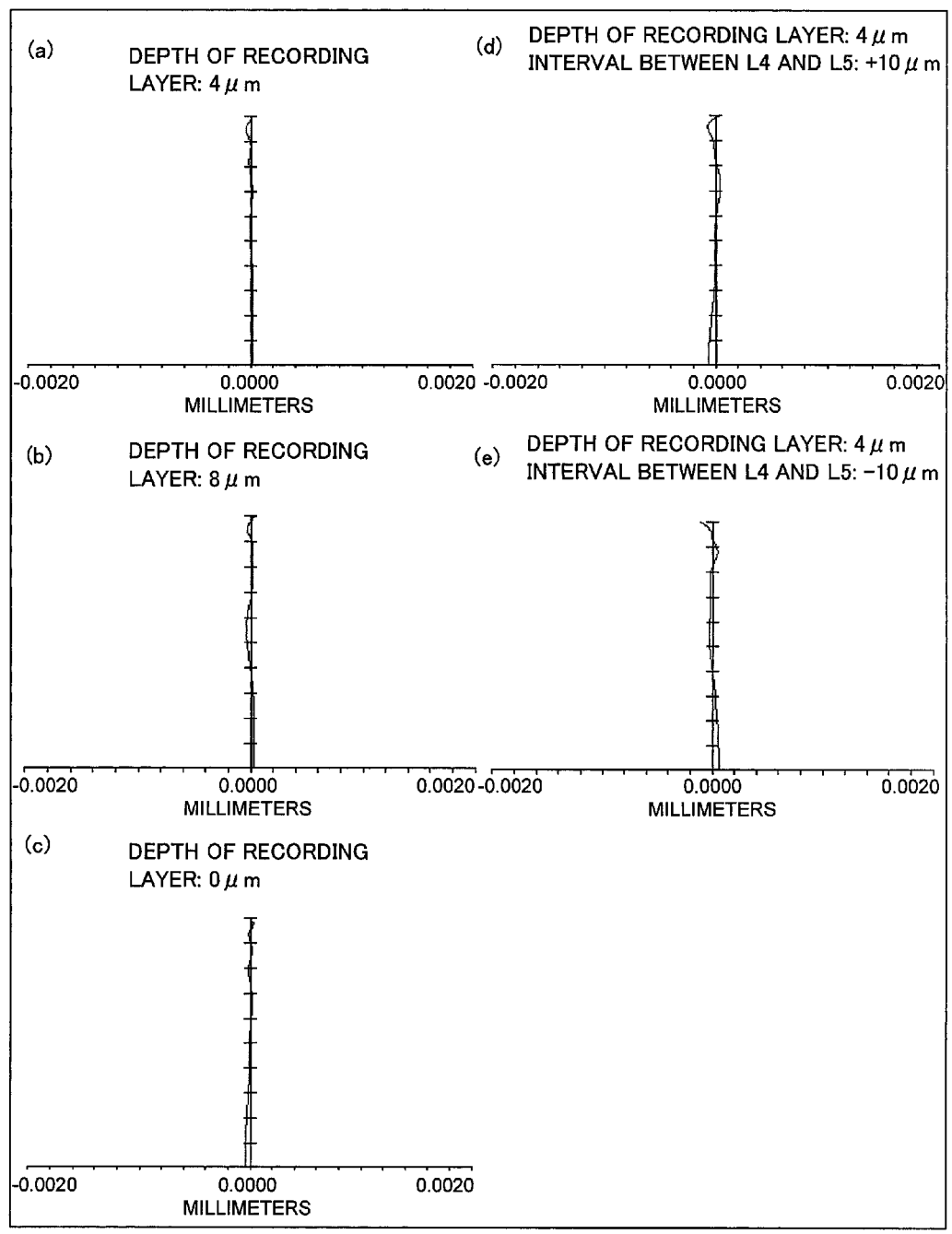
FIG. 16 illustrates graphs showing spherical aberrations of the optical system for optical pickup according to Example 2.

In addition, FIG. 15 illustrates optical path diagrams of the optical system for optical pickup according to Example 2, and FIG. 16 illustrates graphs showing spherical aberrations of the optical system for optical pickup according to Example 2. In FIGS. 15 and 16, (a) corresponds to a state where focusing is performed on the recording layer at a depth of 4 μm; (b) corresponds to a state where focusing is performed on the recording layer at a depth of 8 μm; and (c) corresponds to a state where focusing is performed on the recording layer at a depth of 0 μm. In addition, (d) corresponds to a state where focusing is performed on the recording layer at a depth of 4 μm in the case where the distance between the lens elements L4 and L5 that constitute the objective lens system is larger than a designed value by 10 μm; and (e) corresponds to a state where focusing is performed on the recording layer at a depth of 4 μm in the case where the distance between the lens elements L4 and L5 that constitute the objective lens system is smaller than the designed value by 10 μm.

Further, Table 6 shows the positional relation among the lens elements L1 to L3 that constitute the beam expander, and the correspondence relation between the distance between the lens elements L4 and L5 and the depth of a to-be-focused recording layer. It is noted that the last two rows in Table 6 corresponds to (d) and (e) in FIGS. 15 and 16, respectively.

TABLE 6

|  | Distance between L1 and L2 (mm) | Distance between L2 and L3 (mm) | Distance between L4 and L5 (mm) | Depth of recording layer (mm) |
| --- | --- | --- | --- | --- |
| Surface No. | 2 | 4 | 8 | 10 |
| Recording layer 4 μm | 2.0000 | 2.0000 | 0.9844065 | 0.004 |
| Recording layer 8 μm | 1.2000 | 2.0000 | 0.9844065 | 0.008 |
| Recording layer 0 μm | 2.8386 | 2.0000 | 0.9844065 | 0.000 |
| Recording layer 4 μm Distance between L4 and L5: +10 μm | 1.727654 | 1.465543 | 0.9944065 | 0.004 |
| Recording layer 4 μm Distance between L4 and L5: −10 μm | 2.329216 | 2.526657 | 0.9744065 | 0.004 |

As shown in Table 6, the spot within the optical recording medium can be formed on a desired recording layer by changing the distance between the two lens elements L1 and L2 on the light source side. In addition, as shown in FIGS. 16(a) to (c), the focal point can be adjusted and the spherical aberration can be compensated at the same time, by changing the distance between the lens elements L1 and L2.

Further, as shown in FIGS. 15(d) and (e), FIGS. 16(d) and (e), and Table 6 (the last two rows), even when the distance between the lens elements L4 and L5 that constitute the objective lens system deviates from the designed value due to assembling errors during manufacturing, it is possible to adjust the focal point of the spot within the optical recording medium and to compensate the spherical aberration of the spot at the same time, by moving the lens elements L1 and L2 in the optical axis direction.

Figure 17:
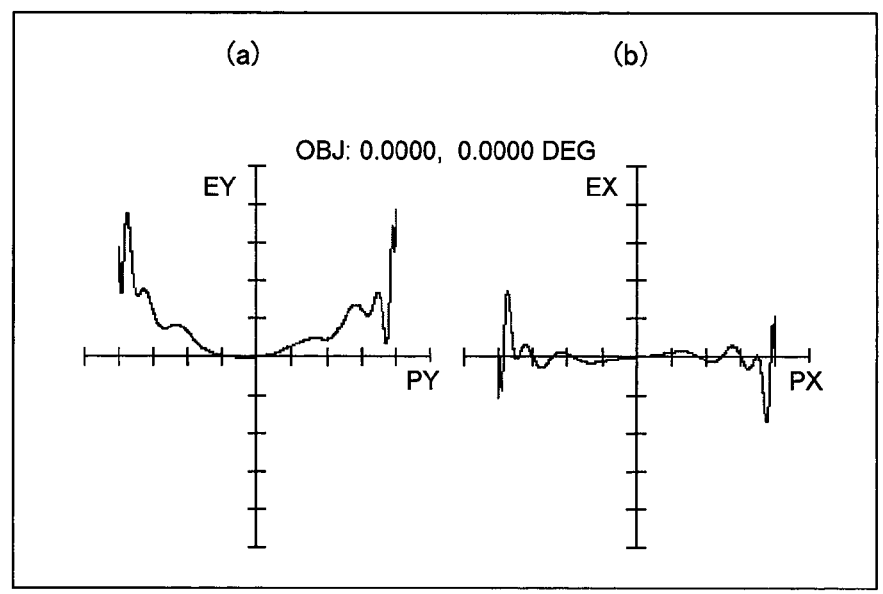
FIG. 17 illustrates graphs showing lateral aberrations of the optical system for optical pickup according to Example 2.
Figure 18:
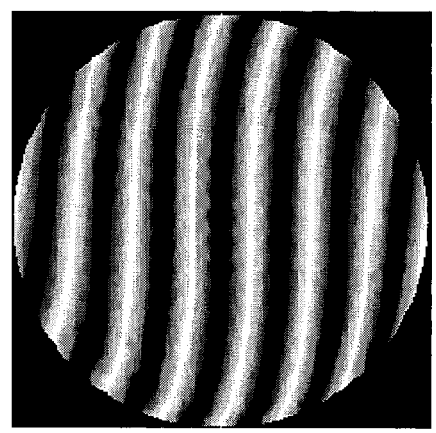
FIG. 18 shows interference fringes appearing when compensating a coma aberration of the optical system for optical pickup according to Example 2.

FIGS. 17(a) and (b) are aberration diagrams (light beam aberration) when the lens element L3 is moved in the direction perpendicular to the optical axis by 10 μm, and show an aberration in the moving direction of the lens element L3 and an aberration in a direction perpendicular to the moving direction, respectively. In addition, FIG. 18 shows interference fringes appearing when the lens element L3 is moved in the direction perpendicular to the optical axis to compensate a coma aberration.

When the lens element L3 is moved in the direction perpendicular to the optical axis by 5 μm, a third-order coma aberration of 15 mλ occurs. When the lens element L3 is moved in the direction perpendicular to the optical axis by 10 μm, a third-order coma aberration of 30 mλ occurs. The value of the generated coma aberration changes substantially linearly with respect to the movement amount of the lens element L3. On the other hand, aberrations other than the third-order coma aberration are equal to or less than 10 mλ. In other words, it is recognized that, when the lens element L3 is moved by 10 μm, when the lens element L3 is moved in the direction perpendicular to the optical axis, the change amount of the third-order coma aberration is sufficiently great as compared to that of the other aberrations. Thus, when a third-order coma aberration occurs due to inclination of the optical recording medium and/or the lens, or the like, it is possible to compensate only the third-order coma aberration without greatly changing the other aberrations, by controlling the movement amount of the lens element L3 so as to cancel the generated third-order coma aberration.

Further, compensation of the third-order coma aberration can be achieved by moving the lens element L1 in the direction perpendicular to the optical axis, instead of the lens element L3. This case will be described below.

Figure 19:
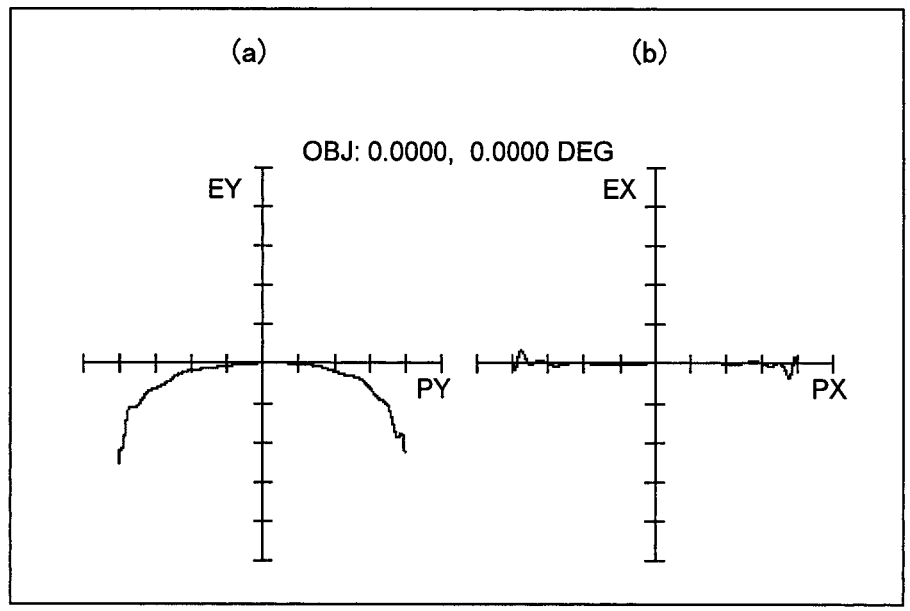
FIG. 19 illustrates graphs showing lateral aberrations of the optical system for optical pickup according to Example 2.
Figure 20:
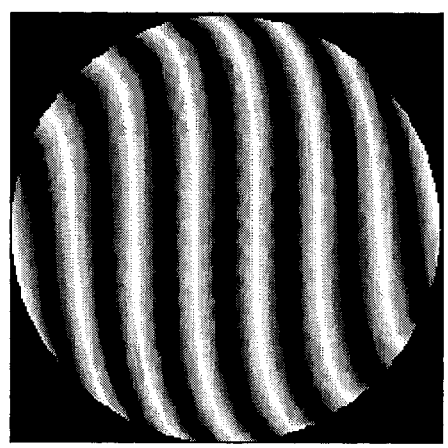
FIG. 20 shows interference fringes appearing when compensating a coma aberration of the optical system for optical pickup according to Example 2.

FIGS. 19(a) and (b) are aberration diagrams (light beam aberration) when the lens element L1 is moved in the direction perpendicular to the optical axis by 10 μm, and show an aberration in the moving direction of the lens element L1 and an aberration in a direction perpendicular to the moving direction, respectively. In addition, FIG. 20 shows interference fringes appearing when the lens element L1 is moved in the direction perpendicular to the optical axis to compensate a coma aberration.

When the lens element L1 is moved in the direction perpendicular to the optical axis by 5 μm, a third-order coma aberration of 24 mλ occurs. When the lens element L1 is moved in the direction perpendicular to the optical axis by 10 μm, a third-order coma aberration of 47 mλ occurs. The value of the generated coma aberration changes substantially linearly with respect to the movement amount of the lens element L1. On the other hand, when the lens element L1 is moved by 10 μm, aberrations other than the third-order coma aberration are equal to or less than 10 mλ. In other words, it is recognized that, even when the lens element L1 is moved in the direction perpendicular to the optical axis, the change amount of the third-order coma aberration is sufficiently great as compared to that of the other aberrations. Therefore, although the change amount of the third-order coma aberration with respect to the movement amount of the lens element L1 is slightly smaller than that of the third-order coma aberration with respect to the movement amount of the lens element L3, only the third-order coma aberration can be compensated without greatly changing the other aberrations, also by moving the lens element L1 in the direction perpendicular to the optical axis.

Example 3

In Example 3, an optical system for optical pickup is designed such that: the wavelength of the light source is 405 nm; the NA of the objective lens system is 1.7; and the focal length of the objective lens system is 1.7 mm. The optical system for optical pickup according to the present example includes: the beam expander including two lens elements; and the objective lens system including an S-SIL element.

Table 7 shows the lens data of the optical system for optical pickup according to Example 3 (excluding the collimator lens system), and Table 8 shows the aspherical data of the first surface and the fourth to sixth surfaces of the lens elements shown in Table 7.

TABLE 7

|  | Surface No. | r (mm) | d (mm) | n (405 nm) | Remarks |
|---|---|---|---|---|---|
| Object surface | 0 |  | ∞ |  |  |
| L1 | 1 | −15.00000 | 1 | 1.62392 | Aspherical |
|  | 2 | ∞ | 2 |  | Planar |
| L2 | 3 | ∞ | 1.5 | 1.62392 | Planar |
|  | 4 | −17.15565 | 3 |  | Aspherical |
| L3 | 5 | 4.522238 | 1.8 | 1.62392 | Aspherical |
|  | 6 | −321.5208 | 0.08515206 |  | Aspherical |
| L4 | 7 | 1.95 | 2.884958 | 2.06820 | Spherical |
|  | 8 | ∞ | 0 |  | Planar |
| Cover layer | 9 | ∞ | 0.0025 | 1.90000 | Planar |
| Recording layer | 10 | ∞ | 0.004 | 1.90000 | Planar |
| Image surface | 11 | ∞ |  |  |  |

TABLE 8

|  | 1st surface | 4th surface | 5th surface | 6th surface |
|---|---|---|---|---|
| k | 2.092350E+01 | 4.589646E+00 | −8.278030E−01 | 0.000000E+00 |
| A2 | 0.000000E+00 | 0.000000E+00 | 0.000000E+00 | 0.000000E+00 |
| A4 | 3.482020E−04 | −1.434625E−04 | 6.981059E−04 | 7.651732E−04 |
| A6 | 5.494470E−05 | 1.508356E−05 | −1.658536E−05 | −1.129876E−04 |
| A8 | 2.685740E−07 | −1.564977E−06 | 2.296561E−07 | 1.268292E−05 |
| A10 | 0.000000E+00 | 0.000000E+00 | 2.328891E−07 | −3.603807E−07 |
| A12 | 0.000000E+00 | 0.000000E+00 | 0.000000E+00 | 0.000000E+00 |
| A14 | 0.000000E+00 | 0.000000E+00 | 0.000000E+00 | 0.000000E+00 |
| A16 | 0.000000E+00 | 0.000000E+00 | 0.000000E+00 | 0.000000E+00 |

Figure 21:
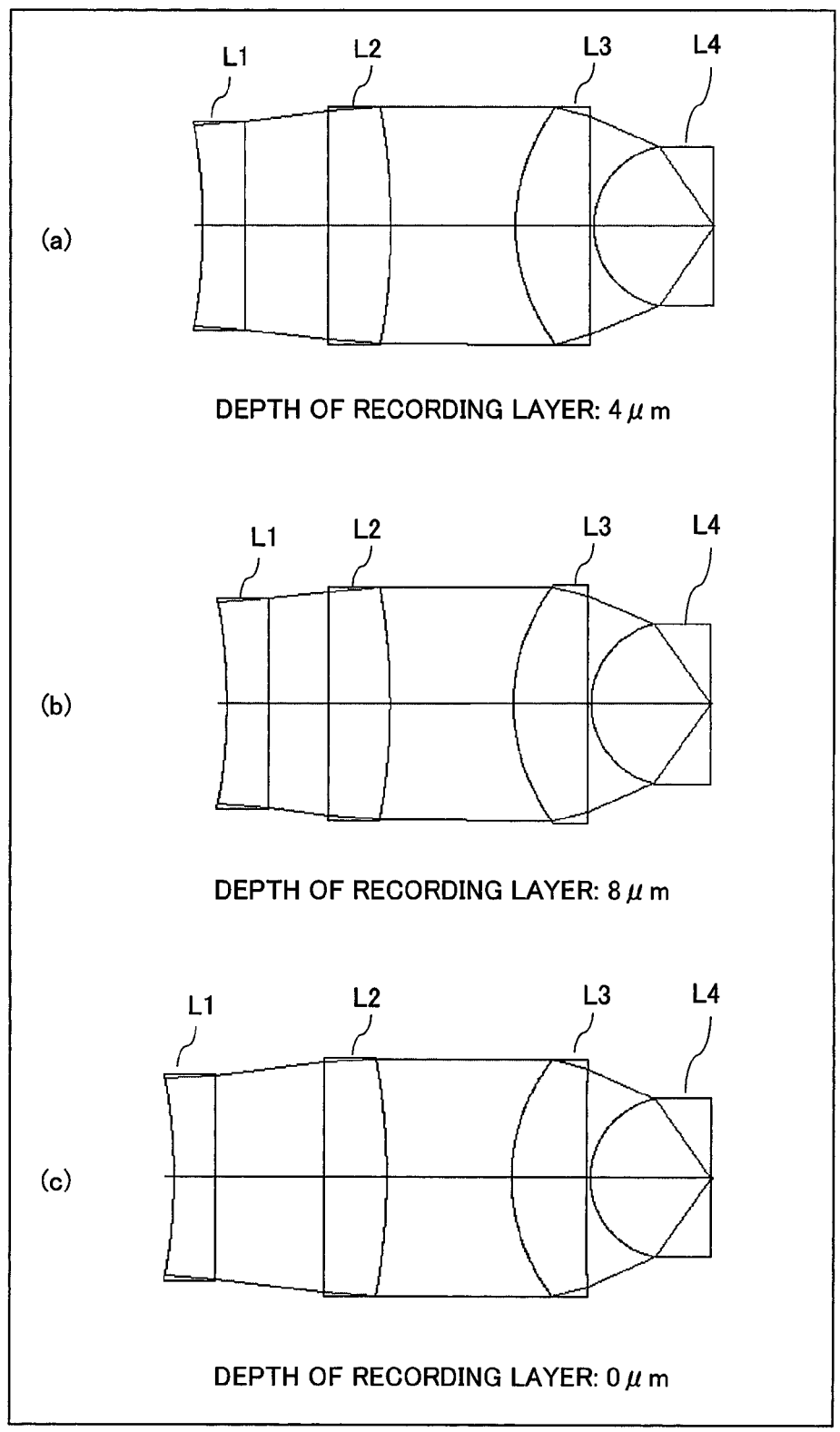
FIG. 21 illustrates optical path diagrams of an optical system for optical pickup according to Example 3.
Figure 22:
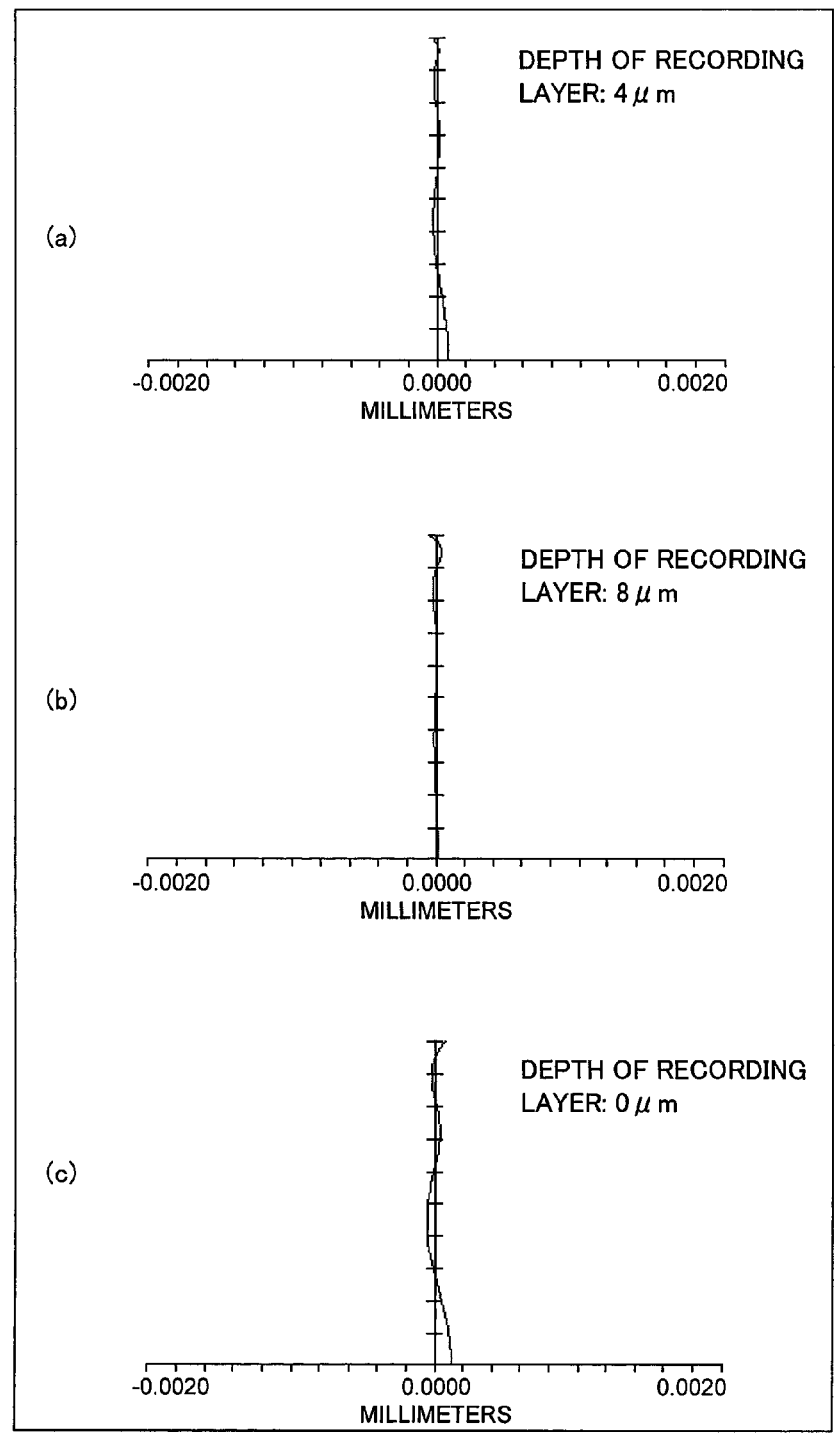
FIG. 22 illustrates graphs showing spherical aberrations of the optical system for optical pickup according to Example 3.

In addition, FIG. 21 illustrates optical path diagrams of the optical system for optical pickup according to Example 3, and FIG. 22 illustrates graphs showing spherical aberrations of the optical system for optical pickup according to Example 3. In FIGS. 21 and 22, (a) corresponds to a state where focusing is performed on the recording layer at a depth of 4 μm; (b) corresponds to a state where focusing is performed on the recording layer at a depth of 8 μm; and (c) corresponds to a state where focusing is performed on the recording layer at a depth of 0 μm.

Further, Table 9 shows the correspondence relation between the distance between the lens elements L1 and L2 that constitute the beam expander and the depth of a to-be-focused recording layer.

TABLE 9

|  | Distance between L1 and L2 (mm) | Depth of recording layer (mm) |
|---|---|---|
| Surface No. | 2 | 10 |
| Recording layer 4 μm | 2.0000 | 0.004 |
| Recording layer 8 μm | 1.4487 | 0.008 |
| Recording layer 0 μm | 2.5756 | 0.000 |

As shown in Table 9, the spot within the optical recording medium can be formed on a desired recording layer by changing the distance between the two lens elements L1 and L2. In addition, as shown in FIGS. 22(a) to (c), the focal point can be adjusted and the spherical aberration can be compensated at the same time, by changing the distance between the lens elements L1 and L2.

Figure 23:
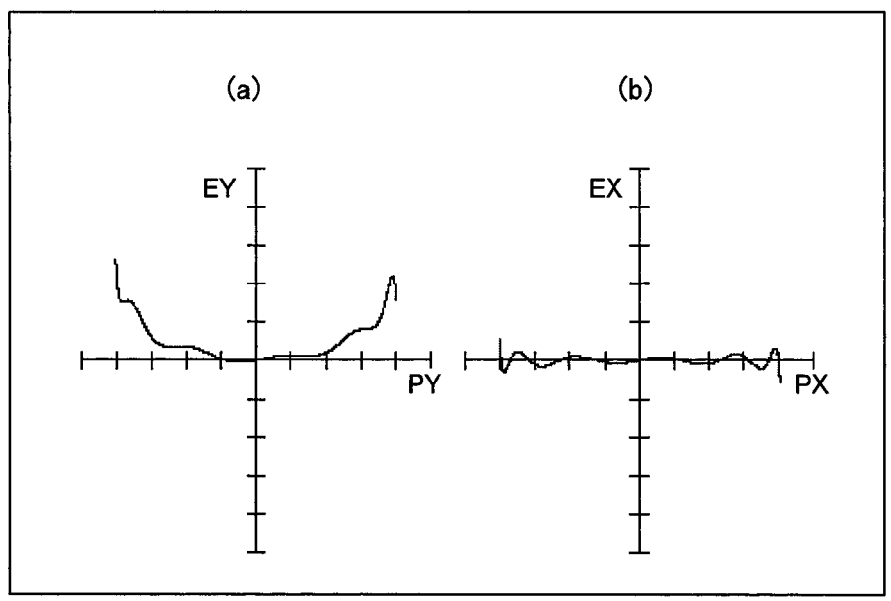
FIG. 23 illustrates graphs showing lateral aberrations of the optical system for optical pickup according to Example 3.
Figure 24:
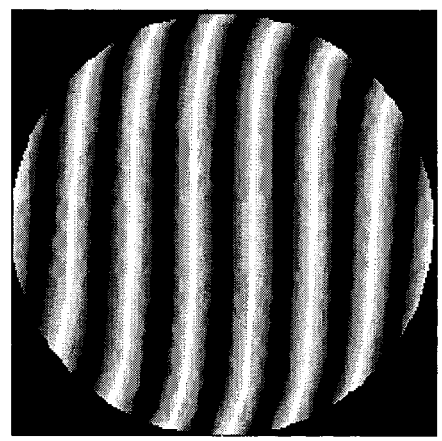
FIG. 24 shows interference fringes appearing when compensating a coma aberration of the optical system for optical pickup according to Example 3.

FIGS. 23(a) and (b) are aberration diagrams (light beam aberration) when the lens element L2 is moved in the direction perpendicular to the optical axis by 5 μm, and show an aberration in the moving direction of the lens element L2 and an aberration in a direction perpendicular to the moving direction, respectively. In addition, FIG. 24 shows interference fringes appearing when the lens element L2 is moved in the direction perpendicular to the optical axis to compensate a coma aberration.

When the lens element L2 is moved in the direction perpendicular to the optical axis by 1 μm, a third-order coma aberration of 5 mλ occurs. When the lens element L2 is moved in the direction perpendicular to the optical axis by 5 μm, a third-order coma aberration of 26 mλ occurs. The value of the generated coma aberration changes substantially linearly with respect to the movement amount of the lens element L2. On the other hand, when the lens element L2 is moved by 5 μm, aberrations other than the third-order coma aberration are equal to or less than 10 mλ. In other words, when the lens element L2 is moved in the direction perpendicular to the optical axis, it is possible to compensate only the third-order coma aberration without greatly changing the other aberrations, by controlling the movement amount of the lens element L2 so as to cancel the generated third-order coma aberration.

Example 4

In Example 4, an optical system for optical pickup is designed such that: the wavelength of the light source is 405 nm; the NA of the objective lens system is 1.7; and the focal length of the objective lens system is 1.9 mm. The optical system for optical pickup according to the present example includes: the beam expander including two lens elements; and the objective lens system including a SIL element.

Table 10 shows the lens data of the optical system for optical pickup according to Example 4 (excluding the collimator lens system), and Table 11 shows the aspherical data of the first surface and the fourth to sixth surfaces of the lens elements shown in Table 10.

TABLE 10

|  | Surface No. | r (mm) | d (mm) | n (405 nm) | Remarks |
|---|---|---|---|---|---|
| Object surface | 0 |  | ∞ |  |  |
| L1 | 1 | −20 | 1 | 1.62392 | Aspherical |
|  | 2 | ∞ | 2 |  | Planar |
| L2 | 3 | ∞ | 1.5 | 1.62392 | Planar |
|  | 4 | −22.21005 | 3 |  | Aspherical |
| L3 | 5 | 2.752362 | 3.4 | 1.61642 | Aspherical |
|  | 6 | −439.2431 | 0.9844065 |  | Aspherical |
| L4 | 7 | 1 | 0.9956205 | 2.06820 | Spherical |
|  | 8 | ∞ | 0 |  | Planar |
| Cover layer | 9 | ∞ | 0.0025 | 1.90000 | Planar |
| Recording layer | 10 | ∞ | 0.004 | 1.90000 | Planar |
| Image surface | 11 | ∞ |  |  |  |

TABLE 11

|  | 1st surface | 4th surface | 5th surface | 6th surface |
|---|---|---|---|---|
| k | 2.053677E+01 | 4.054043E+00 | −5.904042E−01 | 0.000000E+00 |
| A2 | 0.000000E+00 | 0.000000E+00 | 0.000000E+00 | 0.000000E+00 |
| A4 | 1.279396E−04 | −8.028842E−05 | 8.219162E−04 | 5.233926E−03 |
| A6 | 1.508473E−05 | 3.935767E−06 | 5.003009E−05 | −2.000501E−04 |
| A8 | −7.336750E−07 | −4.859439E−07 | 5.050679E−06 | −4.731149E−05 |
| A10 | 0.000000E+00 | 0.000000E+00 | 3.528352E−08 | −2.325174E−06 |
| A12 | 0.000000E+00 | 0.000000E+00 | 1.402773E−08 | 2.028821E−06 |
| A14 | 0.000000E+00 | 0.000000E+00 | 4.429027E−09 | −2.248673E−07 |
| A16 | 0.000000E+00 | 0.000000E+00 | −4.631051E−10 | 8.084586E−09 |

Figure 25:
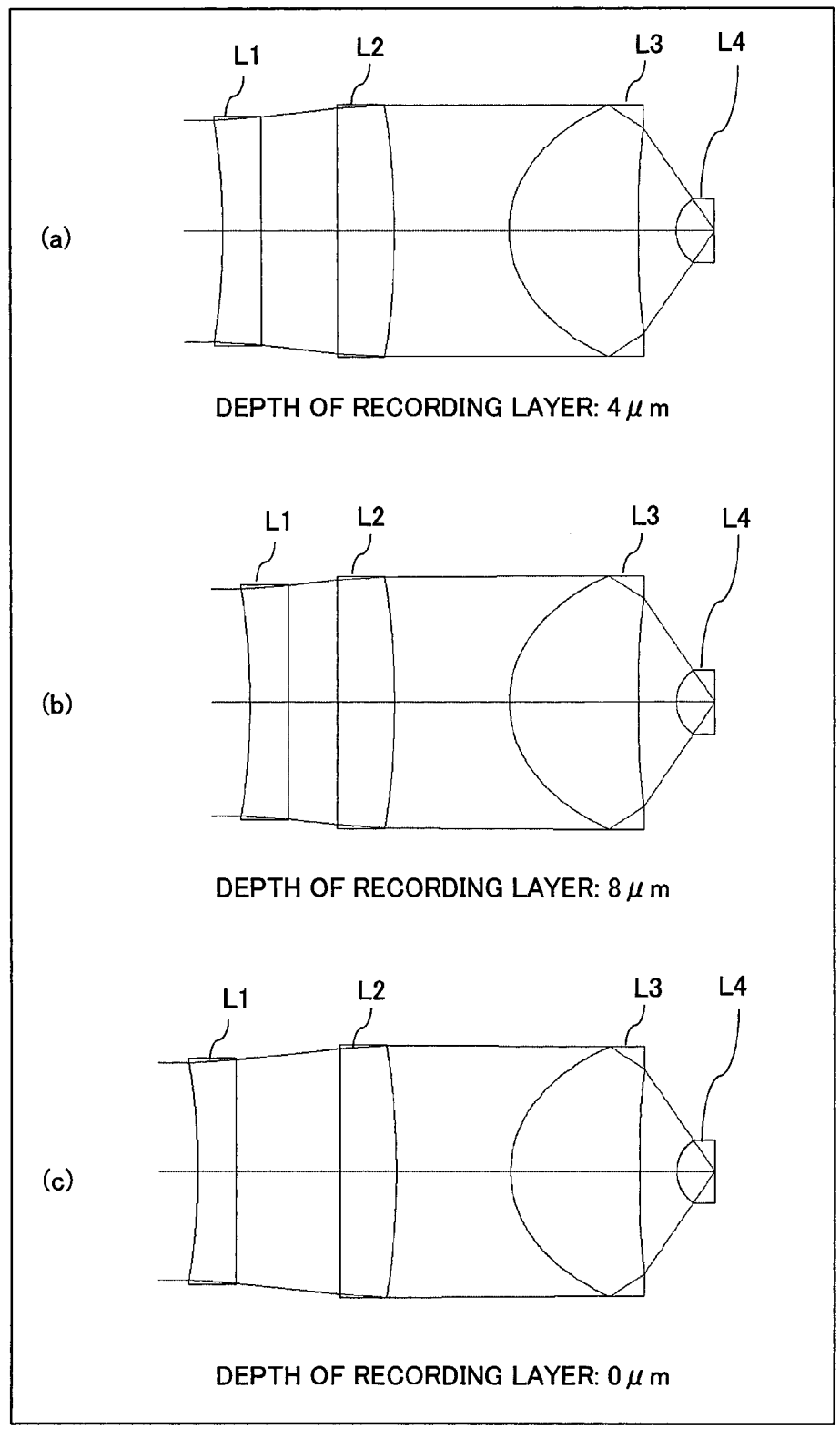
FIG. 25 illustrates optical path diagrams of an optical system for optical pickup according to Example 4.
Figure 26:
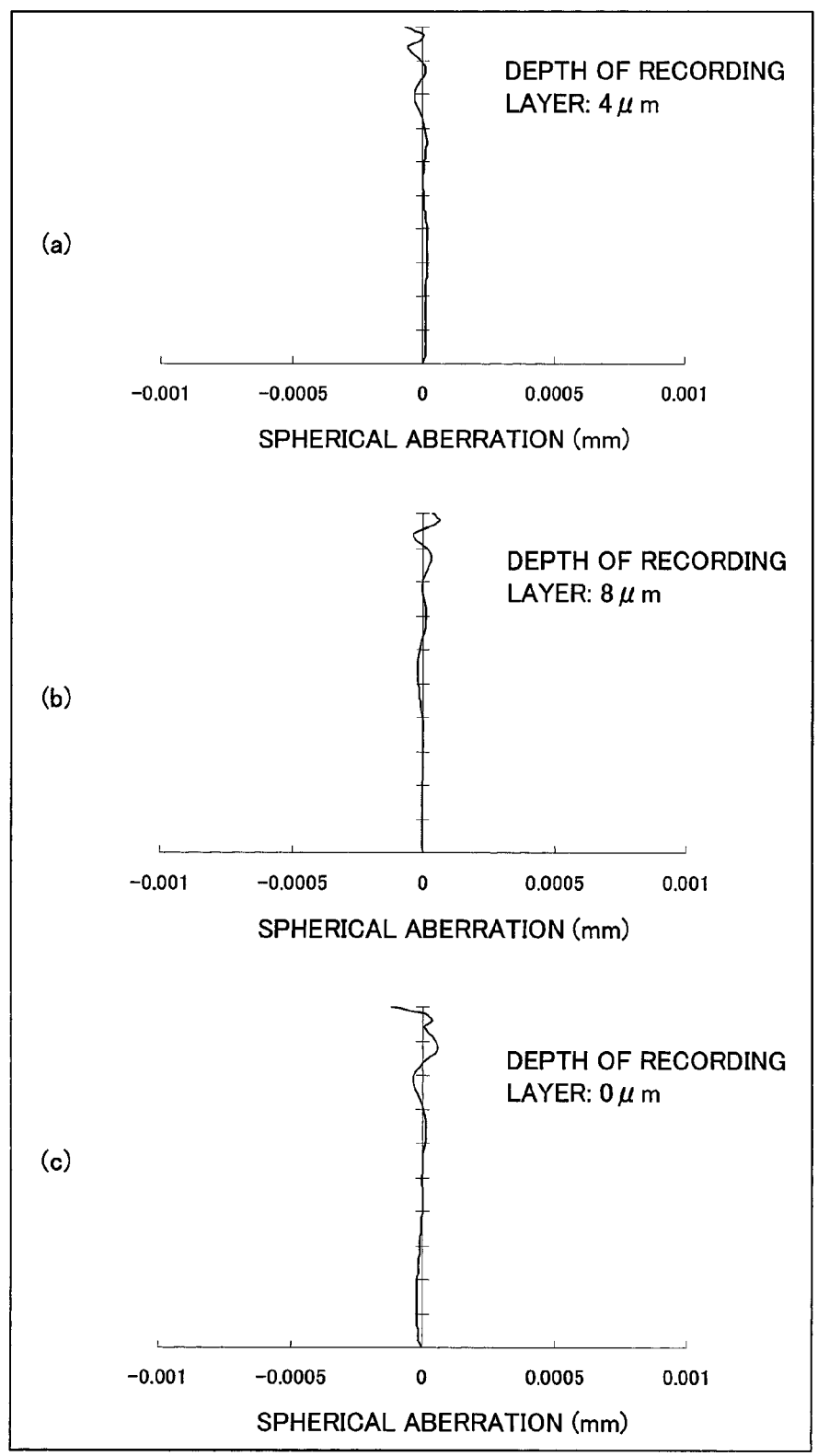
FIG. 26 illustrates graphs showing spherical aberrations of the optical system for optical pickup according to Example 4.

In addition, FIG. 25 illustrates optical path diagrams of the optical system for optical pickup according to Example 4, and FIG. 26 illustrates graphs showing spherical aberrations of the optical system for optical pickup according to Example 4. In FIGS. 25 and 26, (a) corresponds to a state where focusing is performed on the recording layer at a depth of 4 μm; (b) corresponds to a state where focusing is performed on the recording layer at a depth of 8 μm; and (c) corresponds to a state where focusing is performed on the recording layer at a depth of 0 μm.

Further, Table 12 shows the correspondence relation between the distance between the lens elements L1 and L2 that constitute the beam expander and the depth of a to-be-focused recording layer.

TABLE 12

|  | Distance between L1 and L2 (mm) | Depth of recording layer (mm) |
|---|---|---|
| Surface No. | 2 | 10 |
| Recording layer 4 μm | 2.0000 | 0.004 |
| Recording layer 8 μm | 1.2971 | 0.008 |
| Recording layer 0 μm | 2.7344 | 0.000 |

As shown in Table 12, the spot within the optical recording medium can be formed on a desired recording layer by changing the distance between the two lens elements L1 and L2. In addition, as shown in FIGS. 26(a) to (c), the focal point can be adjusted and the spherical aberration can be compensated at the same time, by changing the distance between the lens elements L1 and L2.

Figure 27:
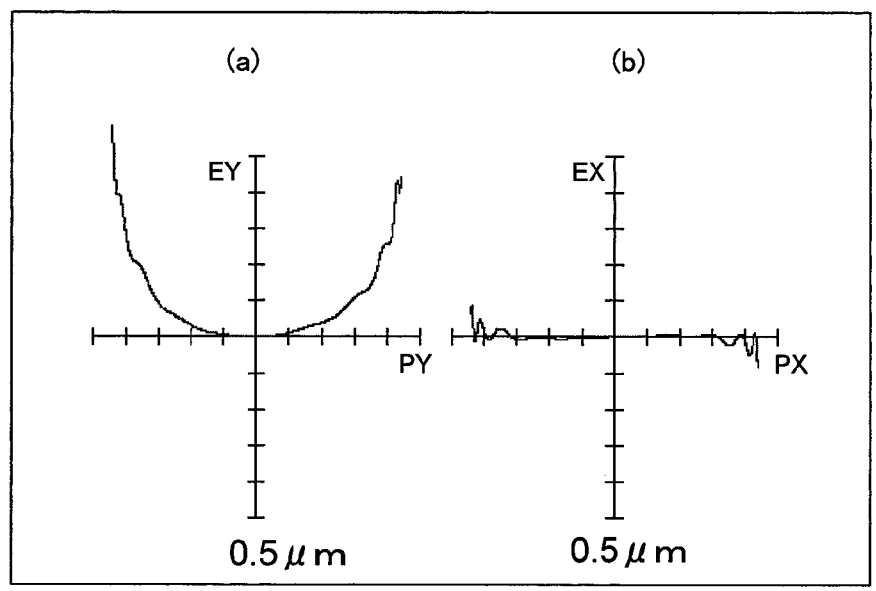
FIG. 27 illustrates graphs showing lateral aberrations of the optical system for optical pickup according to Example 4.
Figure 28:
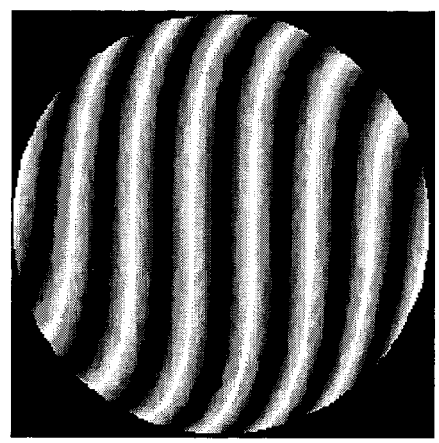
FIG. 28 shows interference fringes appearing when compensating a coma aberration of the optical system for optical pickup according to Example 4.

FIGS. 27(a) and (b) are aberration diagrams (light beam aberration) when the lens element L2 is moved in the direction perpendicular to the optical axis by 5 μm, and show an aberration in the moving direction of the lens element L2 and an aberration in a direction perpendicular to the moving direction, respectively. In addition, FIG. 28 shows interference fringes appearing when the lens element L2 is moved in the direction perpendicular to the optical axis to compensate a coma aberration.

When the lens element L2 is moved in the direction perpendicular to the optical axis by 5 μm, a third-order coma aberration of 25 mλ occurs. When the lens element L2 is moved in the direction perpendicular to the optical axis by 10 μm, a third-order coma aberration of 50 mλ occurs. The value of the generated coma aberration changes substantially linearly with respect to the movement amount of the lens element L2. On the other hand, when the lens element L2 is moved by 10 μm, aberrations other than the third-order coma aberration are equal to or less than 10 mλ. In other words, when the lens element L2 is moved in the direction perpendicular to the optical axis, it is possible to compensate only the third-order coma aberration without greatly changing the other aberrations, by controlling the movement amount of the lens element L2 so as to cancel the generated third-order coma aberration.

INDUSTRIAL APPLICABILITY

The optical system for optical pickup and the optical pickup device according to the present invention can be used in an optical recording/reproducing device that is capable of performing high-density recording on an optical recording medium.

The invention claimed is:

1. An optical system for optical pickup, the optical system being used in an optical pickup device that performs at least one of reading, writing, and erasing of information on a recording layer within an optical recording medium, the optical system comprising:
   a wavefront conversion optical system that includes at least one lens element and converts a wavefront of a light beam emitted from an external light source; and
   an objective optical system that converges a light beam emitted from the wavefront conversion optical system and forms a spot on the recording layer, wherein
   the wavefront conversion optical system adjusts a focal point of the spot on the recording layer and compensates a spherical aberration of the spot in a state where an interval between a surface of the optical recording medium and a lens element of the objective optical system that is nearest to the surface is maintained constant, by changing an interval in an optical axis direction between the light source and the lens element of the wavefront conversion optical system.

2. The optical system according to claim 1, wherein
   the optical pickup device performs at least one of reading, writing, and erasing of information on a plurality of recording layers within the optical recording medium, and
   the wavefront conversion optical system adjusts a focal point of a spot on each of the recording layers and compensates a spherical aberration of the spot in a state where the interval between the surface of the optical recording medium and the lens element of the objective optical system that is nearest to the surface is maintained constant, by changing the interval in the optical axis direction between the light source and the lens element of the wavefront conversion optical system.

3. The optical system according to claim 1, wherein the objective optical system irradiates the recording layer with converged light as evanescent light and forms the spot on the recording layer.

4. The optical system according to claim 3, wherein the objective optical system includes a solid immersion lens element that emits the evanescent light toward the optical recording medium.

5. The optical system according to claim 4, wherein the solid immersion lens element is disposed such that the light beam is incident on an incident surface thereof in a normal direction, and converges the incident light beam on an exit surface thereof without refracting the incident light beam.

6. The optical system according to claim 4, wherein the solid immersion lens element refracts the light beam incident on an incident surface thereof, and converges the light beam on an exit surface thereof.

7. The optical system according to claim 3, wherein the objective optical system includes a solid immersion mirror element that has at least one reflecting surface and emits the evanescent light toward the optical recording medium.

8. The optical system according to claim 1, wherein
   the wavefront conversion optical system, in order from the light source side, includes:
      a collimator lens system that converts diverging light emitted from the light source, into parallel light; and
      a beam expander that includes a plurality of lens elements, is disposed on an optical path of the parallel light emitted from the collimator lens system, and converts a light beam width of the parallel light to emit the parallel light toward the objective optical system, and
   at least one of the lens elements included in the beam expander is moved in the optical axis direction to adjust the focal point of the spot on the recording layer and to compensate the spherical aberration of the spot.

9. The optical pickup device according to claim 1, wherein the wavefront conversion optical system adjusts a focal point of the spot on the recording layer and compensates a spherical aberration of the spot at the same time in a state where an interval between a surface of the optical recording medium and a lens element of the objective optical system that is nearest to the surface is maintained constant, by changing an interval in an optical axis direction between the light source and the lens element of the wavefront conversion optical system.

10. An optical pickup device used in an optical pickup device that performs at least one of reading, writing, and erasing of information on a recording layer within an optical recording medium, the optical pickup device comprising:
    a light source;
    a wavefront conversion optical system that includes at least one lens element and converts a wavefront of a light beam emitted from the light source;
    an objective optical system that converts a light beam emitted from the wavefront conversion optical system and forms a spot on the recording layer;
    a separation section that separates light reflected by the optical recording medium, from an optical path extending from the light source to the optical recording medium; and
    a detection section that detects the light separated by the separation section, wherein
    the wavefront conversion optical system adjusts a focal point of the spot on the recording layer and compensates a spherical aberration of the spot in a state where an interval between a surface of the optical recording medium and a lens element of the objective optical system that is nearest to the surface is maintained constant, by changing an interval in an optical axis direction between the light source and the lens element of the wavefront conversion optical system.

11. The optical pickup device according to claim 10, wherein
    the optical pickup device performs at least one of reading, writing, and erasing of information on a plurality of recording layers within the optical recording medium, and
    the wavefront conversion optical system adjusts a focal point of a spot on each of the recording layers and compensates a spherical aberration of the spot in a state where the interval between the surface of the optical recording medium and the lens element of the objective optical system that is nearest to the surface is maintained constant, by changing the interval in the optical axis direction between the light source and the lens element of the wavefront conversion optical system.

12. The optical pickup device according to claim 10, wherein the objective optical system irradiates the recording layer with converged light as evanescent light and forms the spot on the recording layer.

13. The optical pickup device according to claim 12, wherein the objective optical system includes a solid immersion lens element that emits the evanescent light toward the optical recording medium.

14. The optical pickup device according to claim 13, wherein the solid immersion lens element is disposed such that the light beam is incident on an incident surface thereof in a normal direction, and converges the incident light beam on an exit surface thereof without refracting the incident light beam.

15. The optical pickup device according to claim 13, wherein the solid immersion lens element refracts the light beam incident on an incident surface thereof, and converges the light beam on an exit surface thereof.

16. The optical pickup device according to claim 12, wherein the objective optical system includes a solid immersion mirror element that has at least one reflecting surface and emits the evanescent light toward the optical recording medium.

17. The optical pickup device according to claim 12, wherein
the wavefront conversion optical system, in order from the light source side, includes:
a collimator lens system that converts diverging light emitted from the light source, into parallel light; and
a beam expander that includes a plurality of lens elements, is disposed on an optical path of the parallel light emitted from the collimator lens system, and converts a light beam width of the parallel light to emit the parallel light toward the objective optical system, and
at least one of the lens elements included in the beam expander is moved in the optical axis direction to adjust the focal point of the spot on the recording layer and to compensate the spherical aberration of the spot.

18. The optical pickup device according to claim 10, wherein the wavefront conversion optical system adjusts a focal point of the spot on the recording layer and compensates a spherical aberration of the spot at the same time in a state where an interval between a surface of the optical recording medium and a lens element of the objective optical system that is nearest to the surface is maintained constant, by changing an interval in an optical axis direction between the light source and the lens element of the wavefront conversion optical system.

19. An optical system for optical pickup, the optical system being used in an optical pickup device that performs at least one of reading, writing, and erasing of information on a recording layer within an optical recording medium, the optical system comprising:
a wavefront conversion optical system that converts a wavefront of a light beam emitted from an external light source; and
an objective optical system that forms a spot on the recording layer by converging a light beam emitted from the wavefront conversion optical system and irradiating the recording layer with the converged light beam as evanescent light, wherein
the wavefront conversion optical system, in order from the light source side, includes:
a collimator lens system that converts diverging light emitted from the light source, into parallel light; and
a beam expander that includes three lens elements, is disposed on an optical path of the parallel light emitted from the collimator lens system, and converts a light beam width of the parallel light to emit the parallel light toward the objective optical system, and
at least one of the three lens elements that constitute the beam expander adjusts a focal point of the spot on the recording layer and compensates a spherical aberration of the spot in a state where an interval between a surface of the optical recording medium and a lens element of the objective optical system that is nearest to the surface is maintained constant, by moving in an optical axis direction.

20. The optical system according to claim 19, wherein
two of the three lens elements that constitute the beam expander are movable in the optical axis direction, and
the two lens elements adjust the focal point of the spot on the recording layer and compensate the spherical aberration of the spot, by moving in the optical axis direction while changing an interval therebetween.

21. The optical system according to claim 19, wherein
two of the three lens elements that constitute the beam expander are movable in the optical axis direction,
one of the two lens elements compensates only the spherical aberration of the spot on the recording layer in a state where the interval between the surface of the optical recording medium and the lens element of the objective optical system that is nearest to the surface is maintained constant, by moving in the optical axis direction, and
the other of the two lens elements adjusts the focal point of the spot on the recording layer and compensates the spherical aberration of the spot in a state where the interval between the surface of the optical recording medium and the lens element of the objective optical system that is nearest to the surface is maintained constant, by moving in the optical axis direction.

22. The optical system according to claim 19, wherein one of the three lens elements that constitute the beam expander compensates a coma aberration of the spot on the recording layer in a state where the interval between the surface of the optical recording medium and the lens element of the objective optical system that is nearest to the surface is maintained constant, by moving in a direction perpendicular to an optical axis.

23. The optical system according to claim 19, wherein
the optical pickup device performs at least one of reading, writing, and erasing of information on a plurality of recording layers within the optical recording medium, and
the at least one of the three lens elements that constitute the beam expander adjusts a focal point of a spot on each of the recording layers and compensates a spherical aberration of the spot in a state where the interval between the surface of the optical recording medium and the lens element of the objective optical system that is nearest to the surface is maintained constant, by moving in the optical axis direction.

24. The optical system according to claim 19, wherein the objective optical system includes a solid immersion lens element that emits the evanescent light toward the optical recording medium.

25. The optical system according to claim 24, wherein the solid immersion lens element is disposed such that the light beam is incident on an incident surface thereof in a normal direction, and converges the incident light beam on an exit surface thereof without refracting the incident light beam.

26. The optical system according to claim 24, wherein the solid immersion lens element refracts the light beam incident on an incident surface thereof, and converges the light beam on an exit surface thereof.

27. The optical system according to claim 19, wherein the objective optical system includes a solid immersion mirror element that has at least one reflecting surface and emits the evanescent light toward the optical recording medium.

28. The optical pickup device according to claim 19, wherein at least one of the three lens elements that constitute the beam expander adjusts a focal point of the spot on the recording layer and compensates a spherical aberration of the spot at the same time in a state where an interval between a surface of the optical recording medium and a lens element of the objective optical system that is nearest to the surface is maintained constant, by moving in an optical axis direction.

29. The optical system according to claim 22, wherein one of the three lens elements that constitute the beam expander adjusts a focal point of the spot on the objective optical system and compensates a coma aberration of the spot on the recording layer at the same time in a state where the interval between the surface of the optical recording medium and the lens element of the objective optical system that is nearest to the surface is maintained constant, by moving in a direction perpendicular to an optical axis.

30. An optical pickup device that performs at least one of reading, writing, and erasing of information on a recording layer within an optical recording medium, the optical pickup device comprising:
   a light source;
   a wavefront conversion optical system that converts a wavefront of a light beam emitted from the light source;
   an objective optical system that forms a spot on the recording layer by converging a light beam emitted from the wavefront conversion optical system and irradiating the recording layer with the converged light beam as evanescent light;
   a separation section that separates light reflected by the optical recording medium, from an optical path extending from the light source to the optical recording medium; and
   a detection section that detects the light separated by the separation section, wherein
   the wavefront conversion optical system, in order from the light source side, includes:
      a collimator lens system that converts diverging light emitted from the light source, into parallel light; and
      a beam expander that includes three lens elements, is disposed on an optical path of the parallel light emitted from the collimator lens system, and converts a light beam width of the parallel light to emit the parallel light toward the objective optical system, and
   at least one of the three lens elements that constitute the beam expander adjusts a focal point of the spot on the recording layer and compensates a spherical aberration of the spot in a state where an interval between a surface of the optical recording medium and a lens element of the objective optical system that is nearest to the surface is maintained constant, by moving in an optical axis direction.

31. The optical pickup device according to claim 30, wherein
   two of the three lens elements that constitute the beam expander are movable in the optical axis direction, and the two lens elements adjust the focal point of the spot on the recording layer and compensate the spherical aberration of the spot, by moving in the optical axis direction while changing an interval therebetween.

32. The optical pickup device according to claim 30, wherein
   two of the three lens elements that constitute the beam expander are movable in the optical axis direction,
   one of the two lens elements compensates only the spherical aberration of the spot on the recording layer in a state where the interval between the surface of the optical recording medium and the lens element of the objective optical system that is nearest to the surface is maintained constant, by moving in the optical axis direction, and
   the other of the two lens elements adjusts the focal point of the spot on the recording layer and compensates the spherical aberration of the spot in a state where the interval between the surface of the optical recording medium and the lens element of the objective optical system that is nearest to the surface is maintained constant, by moving in the optical axis direction.

33. The optical pickup device according to claim 30, wherein one of the three lens elements that constitute the beam expander compensates a coma aberration of the spot on the recording layer in a state where the interval between the surface of the optical recording medium and the lens element of the objective optical system that is nearest to the surface is maintained constant, by moving in a direction perpendicular to an optical axis.

34. The optical pickup device according to claim 30, wherein
   the optical pickup device performs at least one of reading, writing, and erasing of information on a plurality of recording layers within the optical recording medium, and
   the at least one of the three lens elements that constitute the beam expander adjusts a focal point of a spot on each of the recording layers and compensates a spherical aberration of the spot in a state where the interval between the surface of the optical recording medium and the lens element of the objective optical system that is nearest to the surface is maintained constant, by moving in the optical axis direction.

35. The optical pickup device according to claim 30, wherein the objective optical system includes a solid immersion lens element that emits the evanescent light toward the optical recording medium.

36. The optical pickup device according to claim 35, wherein the solid immersion lens element is disposed such that the light beam is incident on an incident surface thereof in a normal direction, and converges the incident light beam on an exit surface thereof without refracting the incident light beam.

37. The optical pickup device according to claim 35, wherein the solid immersion lens element refracts the light beam incident on an incident surface thereof, and converges the light beam on an exit surface thereof.

38. The optical pickup device according to claim 30, wherein the objective optical system includes a solid immersion mirror element that has at least one reflecting surface and emits the evanescent light toward the optical recording medium.

39. The optical pickup device according to claim 30, wherein at least one of the three lens elements that constitute the beam expander adjusts a focal point of the spot on the recording layer and compensates a spherical aberration of the spot at the same time in a state where an interval between a surface of the optical recording medium and a lens element of the objective optical system that is nearest to the surface is maintained constant, by moving in an optical axis direction.

40. The optical pickup device according to claim 33, wherein one of the three lens elements that constitute the beam expander adjusts a focal point of the spot on the objective optical system and compensates a coma aberration of the spot on the recording layer at the same time in a state where the interval between the surface of the optical recording medium and the lens element of the objective optical system that is nearest to the surface is maintained constant, by moving in a direction perpendicular to an optical axis.

41. An optical system for optical pickup, the optical system being used in an optical pickup device that performs at least one of reading, writing, and erasing of information on a recording layer within an optical recording medium, the optical system comprising:
 a wavefront conversion optical system that converts a wavefront of a light beam emitted from an external light source; and
 an objective optical system that forms a spot on the recording layer by converging a light beam emitted from the wavefront conversion optical system and irradiating the recording layer with the converged light beam as evanescent light, wherein
 the wavefront conversion optical system, in order from the light source side, includes:
  a collimator lens system that converts diverging light emitted from the light source, into parallel light; and
  a beam expander that includes two lens elements, is disposed on an optical path of the parallel light emitted from the collimator lens system, and converts a light beam width of the parallel light to emit the parallel light toward the objective optical system, and
 at least one of the two lens elements included in the beam expander adjusts a focal point of the spot on the recording layer and compensates a spherical aberration of the spot in a state where an interval between a surface of the optical recording medium and a lens element of the objective optical system that is nearest to the surface is maintained constant, by moving in an optical axis direction.

42. The optical system according to claim 41, wherein only one of the two lens elements included in the beam expander adjusts the focal point of the spot on the recording layer and compensates the spherical aberration of the spot, by moving in the optical axis direction.

43. The optical system according to claim 41, wherein one of the two lens elements included in the beam expander compensates a coma aberration of the spot on the recording layer, by moving in a direction perpendicular to an optical axis.

44. The optical system according to claim 41, wherein
 the optical pickup device performs at least one of reading, writing, and erasing of information on each of a plurality of recording layers within the optical recording medium, and
 the at least one of the two lens elements included in the beam expander adjusts a focal point of a spot on each of the recording layers and compensates a spherical aberration of the spot in a state where the interval between the surface of the optical recording medium and the lens element of the objective optical system that is nearest to the surface is maintained constant, by moving in the optical axis direction.

45. The optical system according to claim 41, wherein the objective optical system includes a solid immersion lens element that emits the evanescent light toward the optical recording medium.

46. The optical system according to claim 45, wherein the solid immersion lens element is disposed such that the light beam is incident on an incident surface thereof in a normal direction, and converges the incident light beam on an exit surface thereof without refracting the incident light beam.

47. The optical system according to claim 45, wherein the solid immersion lens element refracts the light beam incident on an incident surface thereof, and converges the light beam on an exit surface thereof.

48. The optical system according to claim 41, wherein the objective optical system includes a solid immersion mirror element that has at least one reflecting surface and emits the evanescent light toward the optical recording medium.

49. The optical pickup device according to claim 41, wherein at least one of the two lens elements included in the beam expander adjusts a focal point of the spot on the recording layer and compensates a spherical aberration of the spot at the same time in a state where an interval between a surface of the optical recording medium and a lens element of the objective optical system that is nearest to the surface is maintained constant, by moving in an optical axis direction.

50. The optical pickup device according to claim 43, wherein one of the two lens elements included in the beam expander adjusts a focal point of the spot on the objective optical system and compensates a coma aberration of the spot on the recording layer at the same time, by moving in a direction perpendicular to an optical axis.

51. An optical pickup device that performs at least one of reading, writing, and erasing of information on a recording layer within an optical recording medium, the optical pickup device comprising:
 a light source;
 a wavefront conversion optical system that converts a wavefront of a light beam emitted from the light source
 an objective optical system that forms a spot on the recording layer by converging a light beam emitted from the wavefront conversion optical system and irradiating the recording layer with the converged light beam as evanescent light;
 a separation section that separates light reflected by the optical recording medium, from an optical path extending from the light source to the optical recording medium; and
 a detection section that detects the light separated by the separation section, wherein
 the wavefront conversion optical system, in order from the light source side, includes:
  a collimator lens system that converts diverging light emitted from the light source, into parallel light; and
  a beam expander that includes two lens elements, is disposed on an optical path of the parallel light emitted from the collimator lens system, and converts a light beam width of the parallel light to emit the parallel light toward the objective optical system, and
 at least one of the two lens elements included in the beam expander adjusts a focal point of the spot on the recording layer and compensates a spherical aberration of the spot in a state where an interval between a surface of the optical recording medium and a lens element of the objective optical system that is nearest to the surface is maintained constant, by moving in an optical axis direction.

52. The optical pickup device according to claim 51, wherein only one of the two lens elements included in the beam expander adjusts the focal point of the spot on the recording layer and compensates the spherical aberration of the spot, by moving in the optical axis direction.

53. The optical pickup device according to claim 51, wherein one of the two lens elements included in the beam expander compensates a coma aberration of the spot on the recording layer, by moving in a direction perpendicular to an optical axis.

54. The optical pickup device according to claim 51, wherein the optical pickup device performs at least one of reading, writing, and erasing of information on each of a plurality of recording layers within the optical recording medium, and the at least one of the two lens elements included in the beam expander adjusts a focal point of a spot on each of the recording layers and compensates a spherical aberration of the spot in a state where the interval between the surface of the optical recording medium and the lens element of the objective optical system that is nearest to the surface is maintained constant, by moving in the optical axis direction.

55. The optical pickup device according to claim 51, wherein the objective optical system includes a solid immersion lens element that emits the evanescent light toward the optical recording medium.

56. The optical pickup device according to claim 55, wherein the solid immersion lens element is disposed such that the light beam is incident on an incident surface thereof in a normal direction, and converges the incident light beam on an exit surface thereof without refracting the incident light beam.

57. The optical pickup device according to claim 55, wherein the solid immersion lens element refracts the light beam incident on an incident surface thereof, and converges the light beam on an exit surface thereof.

58. The optical pickup device according to claim 51, wherein the objective optical system includes a solid immersion mirror element that has at least one reflecting surface and emits the evanescent light toward the optical recording medium.

59. The optical pickup device according to claim 51, wherein at least one of the two lens elements included in the beam expander adjusts a focal point of the spot on the recording layer and compensates a spherical aberration of the spot at the same time in a state where an interval between a surface of the optical recording medium and a lens element of the objective optical system that is nearest to the surface is maintained constant, by moving in an optical axis direction.

60. The optical pickup device according to claim 53, wherein one of the two lens elements included in the beam expander adjusts a focal point of the spot on the objective optical system and compensates a coma aberration of the spot on the recording layer at the same time, by moving in a direction perpendicular to an optical axis.

* * * * *